(12) United States Patent
Sato et al.

(10) Patent No.: US 6,178,267 B1
(45) Date of Patent: *Jan. 23, 2001

(54) IMAGE PROCESSING APPARATUS

(75) Inventors: Kazuhiko Sato; Hiroshi Oshio; Shigeru Ainai; Hiromitsu Horie; Takao Kamata, all of Kawasaki (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/926,022

(22) Filed: Sep. 9, 1997

(30) Foreign Application Priority Data

Mar. 17, 1997 (JP) .................................... 9-063206

(51) Int. Cl.$^7$ ........................................... G06K 9/36
(52) U.S. Cl. ..................... 382/252; 382/232; 382/237; 358/448; 358/456
(58) Field of Search ..................... 382/252, 254, 382/232, 237; 358/448, 455, 456, 465

(56) References Cited

U.S. PATENT DOCUMENTS

| | | | |
|---|---|---|---|
| 5,087,981 | 2/1992 | Ng et al. | 358/459 |
| 5,463,478 | * 10/1995 | Makita et al. | 358/455 |
| 5,519,509 | * 5/1996 | Hikosaka et al. | 358/456 |
| 5,712,927 | * 1/1998 | Kim et al. | 382/252 |
| 5,757,976 | * 5/1998 | Shu | 382/252 |

FOREIGN PATENT DOCUMENTS

| | | |
|---|---|---|
| 0 415 661 A2 | 8/1989 | (EP) . |
| 0 674 426 A1 | 3/1994 | (EP) . |
| 0 715 450 A2 | 6/1996 | (EP) . |
| 0 767 580 A2 | 4/1997 | (EP) . |
| 5-3540 | 1/1993 | (JP) . |
| WO 90/09075 | 8/1990 | (WO) . |

OTHER PUBLICATIONS

Copy of European Patent Office Communication for European Patent Application No. 97306753 including European Search Report dated Jan. 31, 2000.

* cited by examiner

Primary Examiner—Thomas D. Lee
(74) Attorney, Agent, or Firm—Armstrong, Westerman, Hattori, McLeland & Naughton

(57) ABSTRACT

An image processing apparatus includes a threshold value processing circuit subjecting a correction value with respect to an input image data to a threshold value process and outputting an output image data, a subtracting circuit outputting an error signal based on a difference between the correction value and the output image data, an error filter distributing, as a distributing error data dependent on a value of a diffusion matrix, the error signal to neighborhood pixels of a target pixel within the input image data, and a correction circuit multiplying a coefficient to the input image data or the output image data.

12 Claims, 26 Drawing Sheets

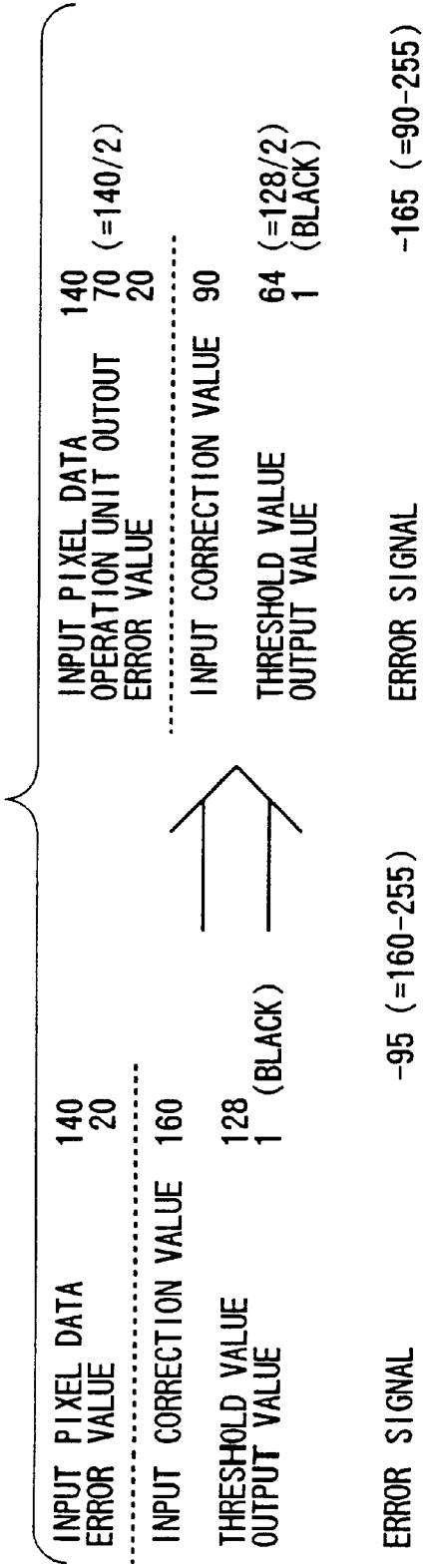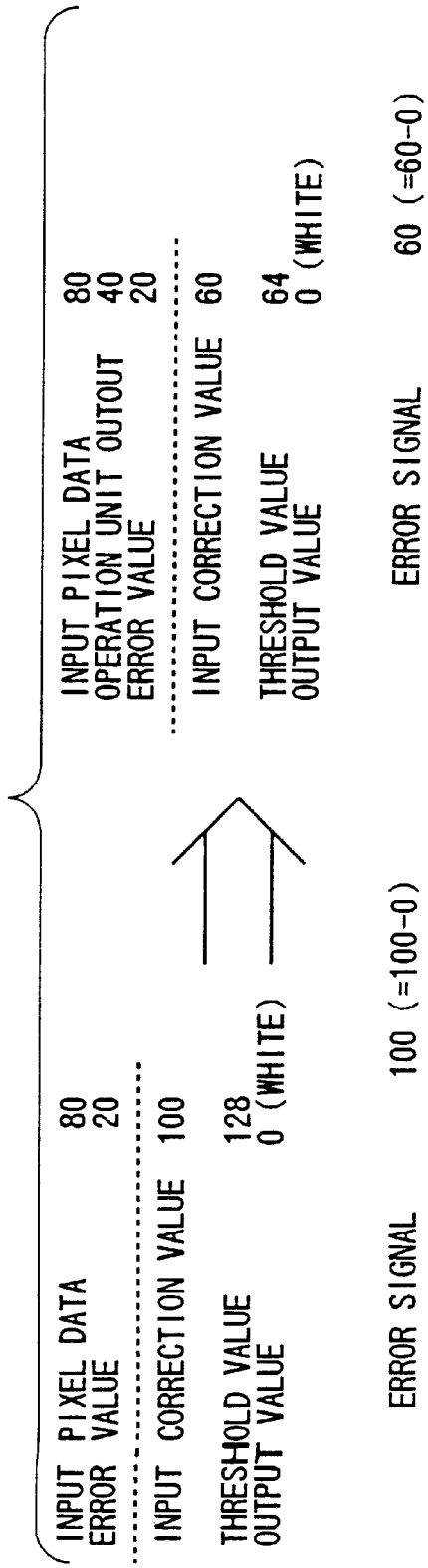

FIG. 5

|  | * | 7/16 |
|---|---|---|
| 3/16 | 5/16 | 1/16 |

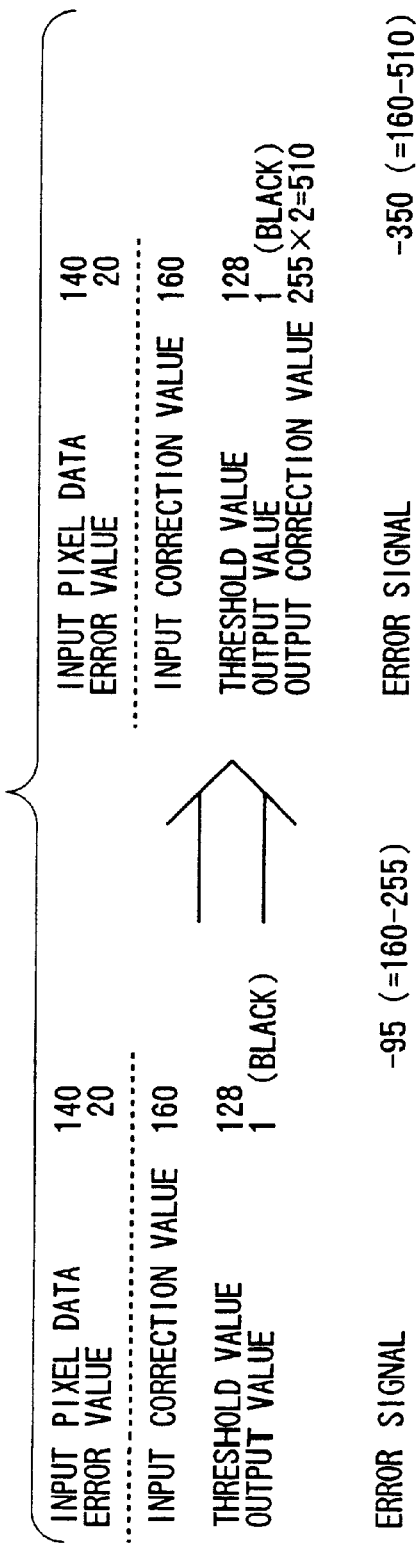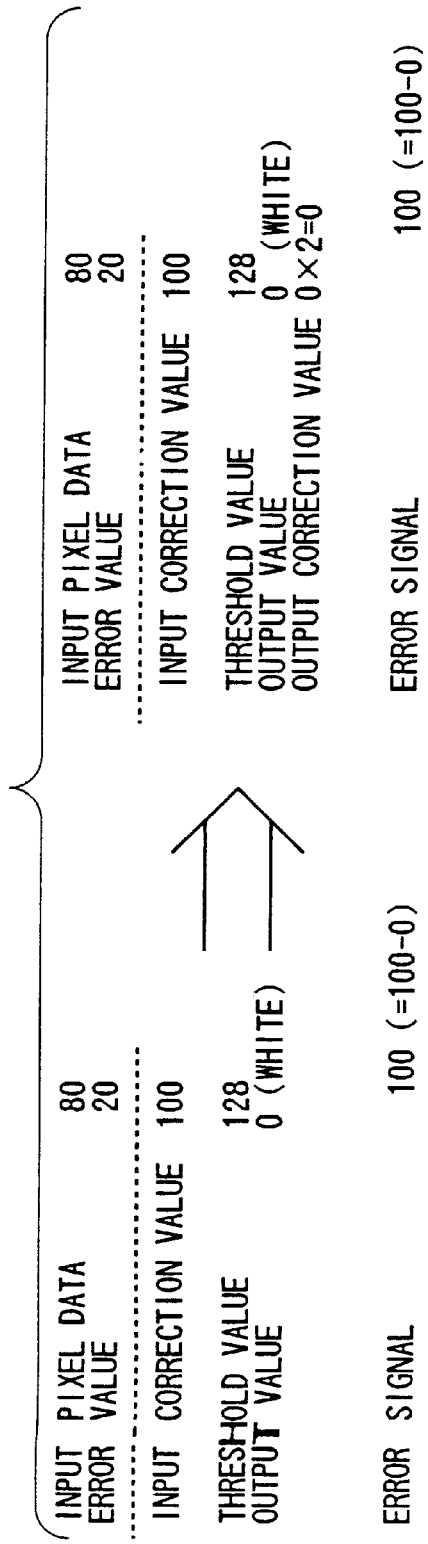

FIG. 23

| VOLTAGE DATA OBTAINED FROM SENSOR | DATA CORRECTION VALUE |
|---|---|
| V 1 | C 1 |
| V 2 | C 2 |
| V 3 | C 3 |
| ⋮ | ⋮ |
| V M | C M |

IMAGE PROCESSING APPARATUS

BACKGROUND OF THE INVENTION

The present invention generally relates to image processing apparatuses, and more particularly to an image processing apparatus which corrects an error diffusion process that subjects an image data to a pseudo halftone processing.

Conventional printers are designed by putting weight on particularly the reproducibility of characters. However, recently, there are more opportunities to process images on a personal computer or the like, and it has also become desirable to print images such as natural images and graphics on the printer with a satisfactory reproducibility.

In the printer which is designed by putting weight on the reproducibility of the characters, the size of one dot is set larger than one dot pitch. For example, the diameter of the dot is set within a range of 1.4 to 2.0 times one dot pitch. By such a setting, the contrast and the visibility of the characters are improved. In other words, the reproducibility of the characters and line drawings is improved by setting the diameter of the dot to 1.8 times one dot pitch, for example.

On the other hand, in the case of an image such as the natural image and graphics, the image is generally printed according to the halftoning method. Various halftoning methods have been proposed, and the error diffusion method is regarded as a promising method. According to the error diffusion method, a difference between the input image density and the output image density is distributed with respect to the neighborhood pixels. As a result, the density of the image as a whole is maintained, and the resolution can be maintained to a considerably high state. For this reason, even if the error diffusion method is applied to a printer having a low resolution, the error diffusion method can print images having a satisfactory quality compared to the case where other halftoning methods are used.

However, if the size of one dot is set larger than one dot pitch when printing the natural image or the like, each dot is printed with an area which is larger than the original dot area. Consequently, the density of the printed image as a whole becomes high, and there was a problem in that saturation occurs for densities greater than or equal to an intermediate level. In addition, this problem was particularly notable when the printing is carried out using the error diffusion method.

SUMMARY OF THE INVENTION

Accordingly, it is a general object of the present invention to provide a novel and useful image processing apparatus in which the problems described above are eliminated.

Another and more specific object of the present invention is to provide an image processing apparatus which can reproduce the gradation with a high fidelity by preventing saturation of the density at high densities of the image, even if the size of one dot is set larger than one dot pitch, by correcting the error diffusion method.

Still another object of the present invention is to provide an image processing apparatus comprising a threshold value processing circuit subjecting a correction value with respect to an input image data to a threshold value process and outputting an output image data; a subtracting circuit outputting an error signal based on a difference between the correction value and the output image data; an error filter distributing, as a distributing error data dependent on a value of a diffusion matrix, the error signal to neighborhood pixels of a target pixel within the input image data; and a correction circuit multiplying a coefficient to the input image data or the output image data. According to the image processing apparatus of the present invention, it is possible to prevent the saturation phenomenon of the density at high densities and to reproduce the gradation with a high fidelity. In addition, the data can be processed at a high speed because the process is simple.

A further object of the present invention is to provide an image processing apparatus comprising a threshold value processing circuit subjecting a correction value with respect to an input image data to a threshold value process and outputting an output image data, a subtracting circuit outputting an error signal based on a difference between the correction value and the output image data, an error filter distributing, as a distributing error data dependent on a value of a diffusion matrix, the error signal to neighborhood pixels of a target pixel within the input image data, and a correction circuit carrying out a process which is different depending on a value of the output image data at one of an input side of the subtracting circuit, an output side of the subtracting circuit and an output side of the error filter. According to the image processing apparatus of the present invention, it is possible to prevent the saturation phenomenon of the density at high densities and to reproduce the gradation with a high fidelity. In addition, the data can be processed at a high speed because the process is simple.

Another object of the present invention is to provide an image processing apparatus comprising a threshold value processing circuit subjecting a correction value with respect to an input image data to a threshold value process and outputting an output image data, a subtracting circuit outputting an error signal based on a difference between the correction value and the output image data, and an error filter distributing, as a distributing error data dependent on a value of one of a plurality of diffusion matrixes based on one of the input image data, the error signal and the correction value, the error signal to neighborhood pixels of a target pixel within the input image data. According to the image processing apparatus of the present invention, it is possible to prevent the saturation phenomenon of the density at high densities and to reproduce the gradation with a high fidelity. In addition, the data can be processed at a high speed because the process is simple. Furthermore, a fine error diffusion can be made depending on the shape of the dot, for example, and a delicate tone curve can be reproduced.

Still another object of the present invention is to provide an image processing apparatus comprising a threshold value processing circuit subjecting a correction value with respect to an input image data to a threshold value process and outputting an output image data, a correction circuit correcting the output image data depending on the input image data, a subtracting circuit outputting an error signal based on a difference between an output of the correction circuit and the input image data, and an error filter distributing, as a distributing error data dependent on a value of a diffusion matrix, the error signal to neighborhood pixels of a target pixel within the input image data. According to the image processing apparatus of the present invention, it is possible to prevent the saturation phenomenon of the density at high densities and to reproduce the gradation with a high fidelity. In addition, the data can be processed at a high speed because the process is simple. Moreover, a delicate tone curve can be reproduced because the correction is carried out depending on the input image data.

Other objects and further features of the present invention will be apparent from the following detailed description when read in conjunction with the accompanying drawings.

BRIEF DESCRIPTION OF THE DRAWINGS

FIGS. 4A and 4B respectively are diagrams for explaining the operation of the first embodiment of the image processing apparatus;

FIG. 5 is a diagram for explaining distribution with respect to neighborhood pixels of a target pixel;

FIGS. 10A and 10B respectively are diagrams for explaining the operation of the second embodiment of the image processing apparatus;

FIG. 23 is a diagram for explaining a table used by a data correction circuit of the tenth embodiment of the image processing apparatus;

DESCRIPTION OF THE PREFERRED EMBODIMENTS

According to the image processing apparatus of the present invention, it is possible to prevent the saturation phenomenon of the density at high densities and to reproduce the gradation with a high fidelity. In addition, the data can be processed at a high speed because the process is simple.

More particularly, a coefficient is multiplied to an input image data or an output image data of an error diffusion processing system.

Alternatively, a different process is carried out depending on a value of the output image data at the input side of a subtracting circuit of the error diffusion processing system, the output side of the subtracting circuit or the output side of an error filter.

Furthermore, in the error diffusion processing system, the error signal may be distributed, as a distributing error data dependent on a value of a diffusion matrix, to neighborhood pixels of a target pixel within the input image data.

In addition, in the error diffusion processing system, a correction may be carried out with respect to the output image data depending on the input image data.

A detailed description of the present invention will hereinafter be given with reference to embodiments of the image processing apparatus according to the present invention.

Figure 1:
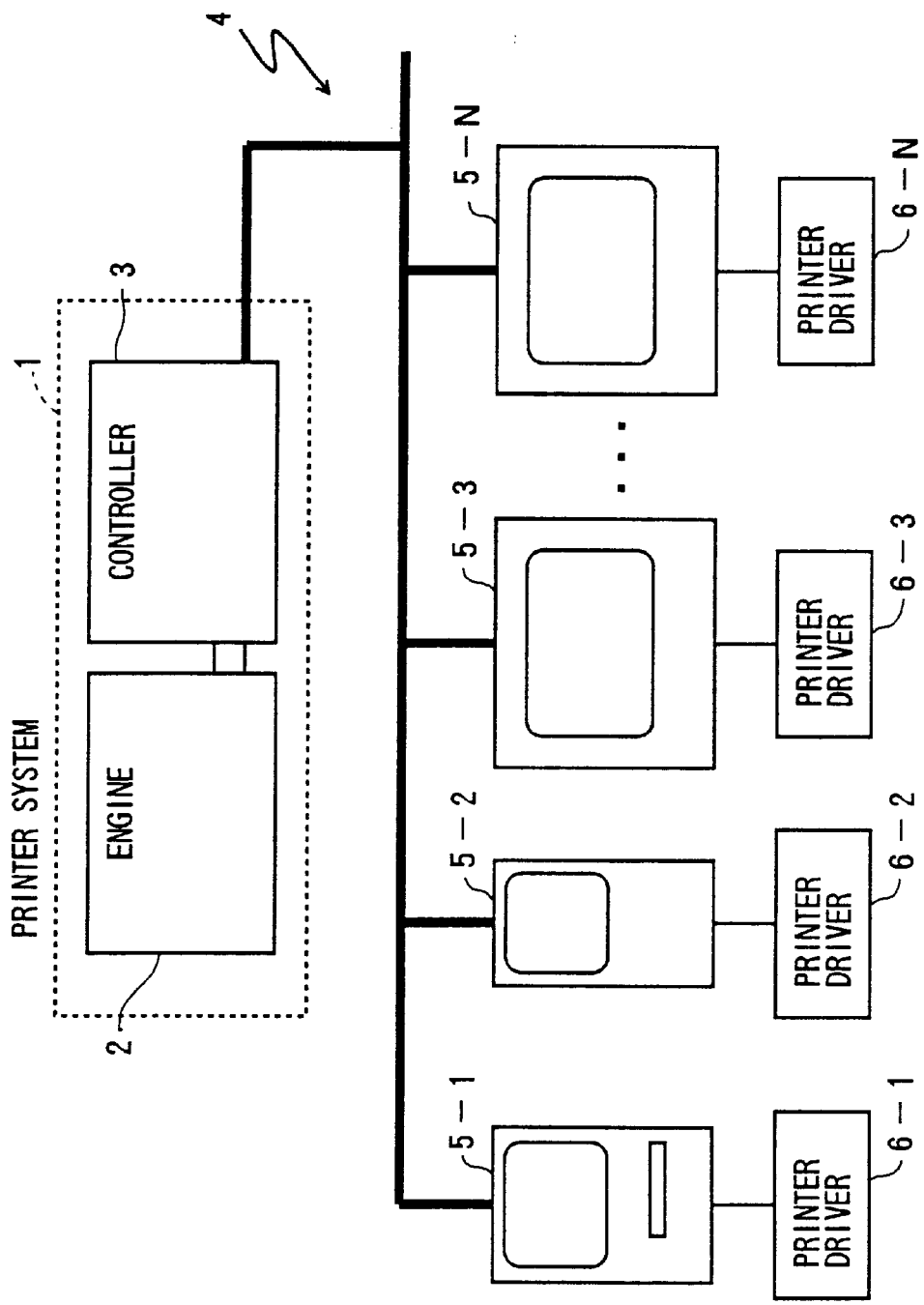
FIG. 1 is a system block diagram showing the general construction of a computer system to which a first embodiment of an image processing apparatus according to the present invention is applied.
Figure 2:
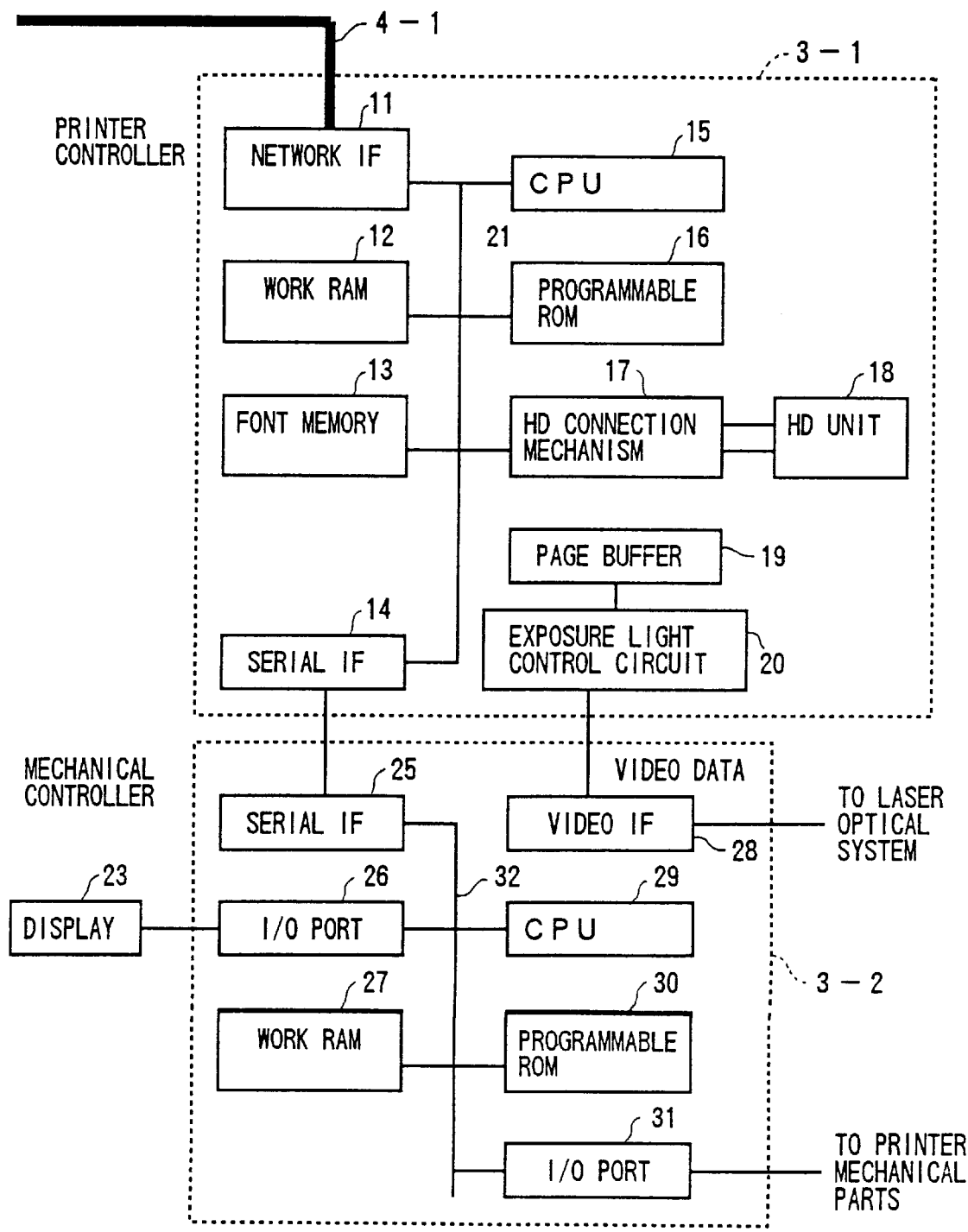
FIG. 2 is a system block diagram showing the general construction of a controller of a printer system.

First, a description will be given of a first embodiment of the image processing apparatus according to the present invention. FIG. 1 is a system block diagram showing the general construction of a computer system which is applied with this embodiment, and FIG. 2 is a system block diagram showing the general construction of a controller of a printer system. In this embodiment, the present invention is applied to the printer system.

The computer system shown in FIG. 1 generally includes a printer system 1, and a plurality of terminal equipments 5-1 through 5-N which are coupled to the printer system 1 via a network 4. The printer system 1 includes an engine 2 and a controller 3. In this embodiment, the terminal equipments 5-1 through 5-N are computers including corresponding printer drivers 6-1 through 6-N.

As shown in FIG. 2, the controller 3 of the printer system 1 generally includes a printer controller 3-1 and a mechanical controller 3-2. The printer controller 3-1 includes a network interface (IF) 11, a work RAM 12, a font memory 13, a serial interface (IF) 14, a CPU 15, a programmable ROM 16, a hard disk (HD) connection mechanism 17, a hard disk (HD) unit 18, a page buffer 19, an exposure light control circuit 20, and a bus 21.

The network IF 11 couples the printer controller 3-1 to the terminal equipments 5-1 through 5-N via a network cable 4-1 of the network 4. The work RAM 12 stores data including data which are processed by the CPU 15 and intermediate data obtained by the calculation carried out by the CPU 15. The font memory 13 stores font data related to fonts. The serial IF 14 is coupled to a serial interface (IF) 25 of the mechanical controller 3-2. The CPU 14 controls the entire printer controller 3-1. The programmable ROM 16 stores programs which are executed by the CPU 15, and the like. The HD connection mechanism 17 couples the HD unit 18 which stores data to the bus 21. The page buffer 19 is provided to temporarily store data, and a high-speed data access can be made with respect to the page buffer 19 as compared to the HD unit 18. The data obtained via the network cable 4-1 and the network IF 11 are once stored in the page buffer 19 and then stored in the HD unit 18 via the HD connection mechanism 17. In addition, the data output from the printer controller 3-1 are once read from the HD unit 18 and then stored in the page buffer 19. The! exposure light control circuit 20 supplies video data to a video interface (IF) 28 of the mechanical controller 3-2 based on the data from the page buffer 19. In addition, the bus 21 couples the CPU 15 to the network IF 11, the work RAM 12, the font memory 13, the serial IF 14, the programmable ROM 16, the HD connection mechanism 17 and the page buffer 19.

On the other hand, the mechanical controller 3-2 includes the serial interface 25, an input/output (I/O) port 26, a work RAM 27, the video IF 28, a CPU 29, a programmable ROM 30, an input/output (I/O) port 31, and a bus 32.

The serial IF 25 exchanges the data with the printer controller 3-1 via the serial IF 14. The I/O port 26 is connected to a display 23 of the printer system 1, and supplies display data on the bus 32 to the display 23. The work RAM 27 stores data including the data which are processed by the CPU 29 and intermediate data obtained by the calculation carried out by the CPU 29. The video IF 28 receives the video data from the exposure light control circuit 20 of the printer controller 3-1, and supplies the video data to a known laser optical system (not shown). The CPU 29 controls the entire mechanical controller 3-2. The programmable ROM 30 stores programs which are executed by the CPU 29, and the like. The I/O port 31 supplies data and the like on the bus 32 to known printer mechanical parts (not shown) of the printer system 1, and supplies signals from the printer mechanical parts to the CPU 29 via the bus 32. For example, a motor, a solenoid, a power supply, a switch, a sensor and the like are included in the printer mechanical parts. The bus 32 couples the CPU 29 to the serial IF 29, the I/O port 26, the work RAM 27, the programmable ROM 30 and the I/O port 31.

The construction of the printer system 1 is not limited to that described above, and the present invention is similarly applicable to various printer systems having other known constructions. The present invention is related particularly to the process within the controller 3, that is, the process of the CPU 15 within the printer controller 3-1.

Figure 3:
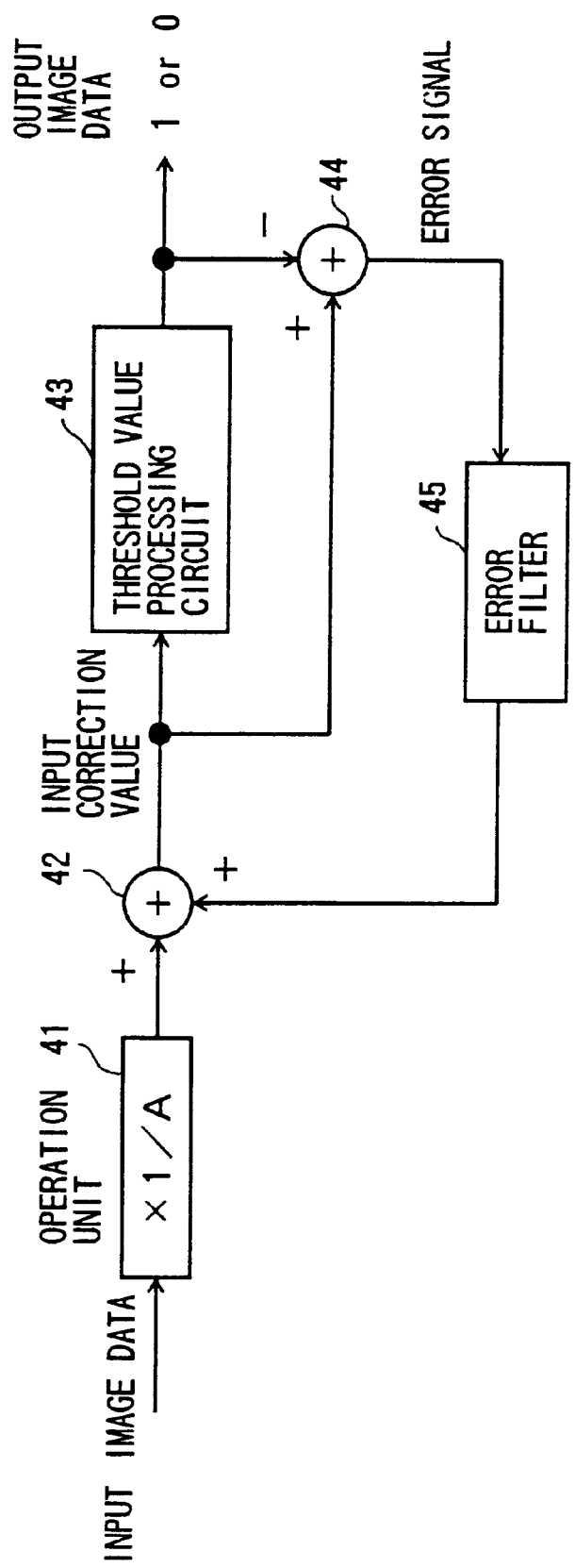
FIG. 3 is a system block diagram showing an important part of the first embodiment of the image processing apparatus.

FIG. 3 is a system block diagram showing an important part of the first embodiment. FIG. 3 functionally shows the operation of the CPU 15 within the printer controller 3-1 shown in FIG. 2. In other words, the operation of the first embodiment can be realized by use of the construction shown in FIG. 3 in place of the CPU 15.

In FIG. 3, an error diffusion processing system of the image processing apparatus generally includes an operation unit (data correction circuit) 41, an adder 42, a threshold value processing circuit 43, a subtracting unit 44, and an error filter 45. The general operation of the error diffusion processing system includes the following steps (i) through (vii). The step (i) obtains a target pixel data related to a target pixel from an input image data from the terminal equipment 5-1, for example. The step (ii) adds an error value which is diffused to the target pixel from another pixel which has already been processed, so as to obtain an input correction data. The step (iii) compares the input correction data and a threshold value. The step (iv) regards the target pixel data to be black if the density of the input correction data is greater than or equal to the threshold value as a result of the comparison made in the step (iii), and regards the target pixel data to be white if the density of the input correction data is less than the threshold value. The step (v) calculates an error signal which indicates a difference between the value of the input correction data and the value of the target pixel data. The step (vi) obtains a distributing error data by multiplying a value of a diffusion matrix to the error signal, and distributes the distributing error data to the neighborhood pixels of the target pixel. The step (vii) stores the distributing error data in a storage means such as the page buffer 19, and carries out the process with respect to the next pixel in turn.

The step (i) is carried out by use of the functions of the CPU 15 other than those shown in FIG. 3, and the step (ii) is carried out by the adder 42. The steps (iii) and (iv) are carried out by the threshold value processing circuit 43, and the step (v) is carried out by the subtracting unit 44. The steps (vi) and (vii) are carried out by the error filter 45. Of course, the step (vii) may be carried out by use of the functions of the CPU 15 other than those shown in FIG. 3.

This embodiment is characterized in that a step (S) of multiplying a coefficient 1/A to the target pixel data is provided between the above described steps (i) and (ii). This step (S) is carried out by the operation unit 41 shown in FIG. 3. As a result, it is possible to change the value of the target pixel data and adjust the density of the image by adjusting the number of dots.

For the sake of convenience, it will be assumed that the input image data is a 8-bit bit map data having a value 0 for white and a value 255 for black, and that a binary output image data output from the threshold value processing circuit 43 has a value 0 for white and a value 1 for black. In this case, the process of the error diffusion processing system shown in FIG. 3 becomes as shown in FIGS. 4A and 4B when A=2. In FIGS. 4A and 4B, the left portion indicates the process for the case where no operation unit 41 shown in FIG. 3 is provided, and the right portion indicates the process for the case where the operation unit 41 shown in FIG. 3 is provided. Further, FIG. 4A indicates a case where the target pixel data, that is, the input pixel data has a value 140, and FIG. 4B indicates a case where the input pixel data has a value 80.

First, a description will be given of the process for the case where no operation unit 41 is provided. In this case, when the value of the input pixel data is 140 and an error value output from the error filter 45 is 20 as shown on the left portion of FIG. 4A, the input correction data output from the adder 42 has a value 160 (=140+20). The error value is a sum of error values which are diffused with respect to the target pixel from the neighborhood pixels. If the threshold value is 128 and the value of the output pixel data of the threshold value processing circuit 43 is 1 (black), the value of the error signal output from the subtracting unit 44 is −95(=160−255). This error signal is distributed to the neighborhood pixels as the distributing error data dependent on the value of the diffusion matrix of the error filter 45.

Figure 5:
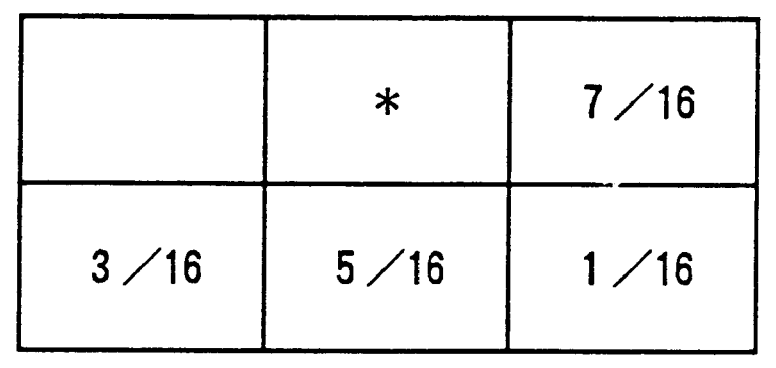

Next, a description will be given of the process of this embodiment in which the operation unit 41 is provided. In this case, when the value of the input pixel data is 140 and an error value output from the error filter 45 is 20 as shown in the right portion of FIG. 4A, the value of the output pixel data of the operation unit 41 is 70(=140÷2) because the operation unit 41 multiplies a coefficient ½ to the value of the input pixel data. Hence, the input correction data output from the adder 42 has a value 90(=70+20). If the threshold value is 64(=128÷2) and the value of the output pixel data of the threshold value processing circuit 43 is 1 (black), the error signal output from the subtracting unit 44 has a value −165(=90−255). This error signal is distributed to the neighborhood pixels as the distributing error data dependent on the value of the diffusion matrix. For example, if the distribution with respect to the neighborhood pixels of the target pixel indicated by a mark "*" in FIG. 5 is set as shown in FIG. 5, the distribution with respect to the pixel located at the bottom right of the target pixel is $-165\times(1/16)\approx-10.3$, and the distribution with respect to the pixel located at the bottom of the target pixel is $-165\times(5/16)\approx-51.6$.

Therefore, although the value of the error signal is −105 when no operation unit 41 is provided, the value of the error signal becomes −165 when the operation unit 41 is provided, and this embodiment can diffuse a large negative error to the neighborhood pixels compared to the case where no operation unit 41 is provided. As a result, this embodiment can reduce the dots which become black pixels, and the excessive increase of the density due to the large diameter of the dots is suppressed, thereby making it possible to obtain the density of the image which is originally desired.

As shown in the left portion of FIG. 4B, the value of the input pixel data is 80 when no operation unit 41 is provided, and the value of the input correction data output from the adder 42 is 100(=80+20) when the error value output from the error filter 45 is 20. If the threshold value is 128 and the value of the output pixel data of the threshold value processing circuit 43 is 0 (white), the value of the error signal output from the subtracting unit 44 is 100(=100−0). This error signal is distributed to the neighborhood pixels as the distributing error data dependent on the value of the diffusion matrix of the error filter 45.

On the other hand, when the operation unit 41 is provided and the value of the input pixel data is 80 and the error value output from the error filter 45 is 20 as shown in the right portion of FIG. 4B, the value of the output pixel data of the operation unit 41 is 40(=80÷2) and the value of the input correction data output from the adder 42 is 60(=40+20) because the operation unit 41 multiplies the coefficient ½ to the value of the input pixel data. If the threshold value is 64(=128÷2) and the value of the output pixel data of the threshold value processing circuit 43 is 0 (white), the value of the error signal output from the subtracting unit 44 is 60 (=60−0). This error signal is distributed to the neighborhood pixels as the distributing error data dependent on the value of the diffusion matrix.

Therefore, although the value of the error signal is 100 when no operation unit 41 is provided, the value of the error signal becomes 60 when the operation unit 41 is provided, and this embodiment can diffuse a small positive error to the neighborhood pixels compared to the case where no operation unit 41 is provided. As a result, this embodiment can increase the dots which become white pixels, and the excessive increase of the density due to the large diameter of the dots is suppressed, thereby making it possible to obtain the density of the image which is originally desired.

Figure 6:
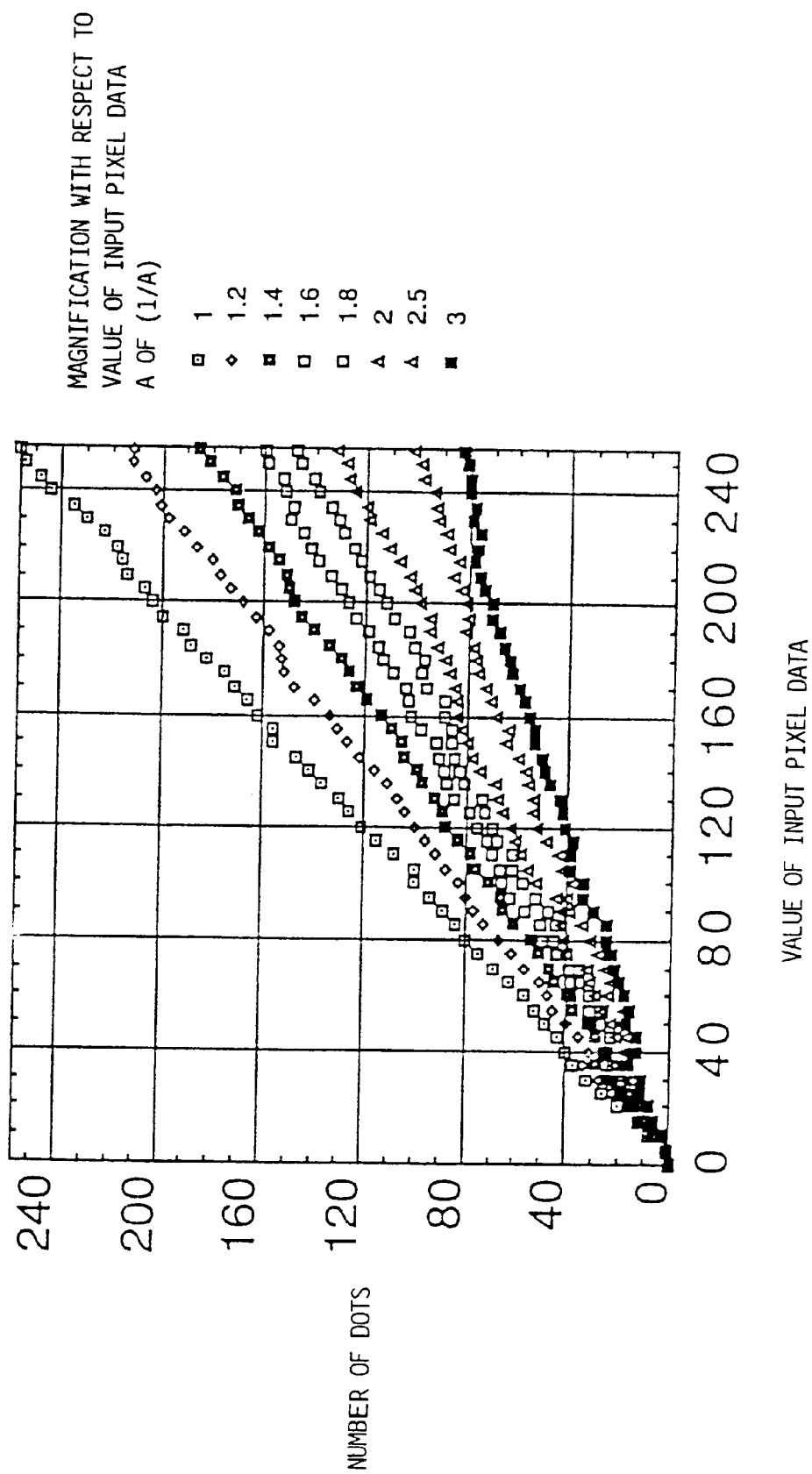
FIG. 6 is a diagram showing a change in the number of dots when the value of the input correction data, for various coefficients.

FIG. 6 is a diagram showing the change in the number of dots when the value of the input correction data is changed, for cases where the coefficient A is 1, 1.2, 1.4, 1.6, 1.8, 2, 2.5 and 3. For the sake of convenience, FIG. 6 shows the processing result for the case where the input image data is processed in a range of 16×16 dots. In FIG. 6, the ordinate indicates the number of dots, and the abscissa indicates the value of the target pixel data, that is, the value of the input pixel data.

Figure 7:
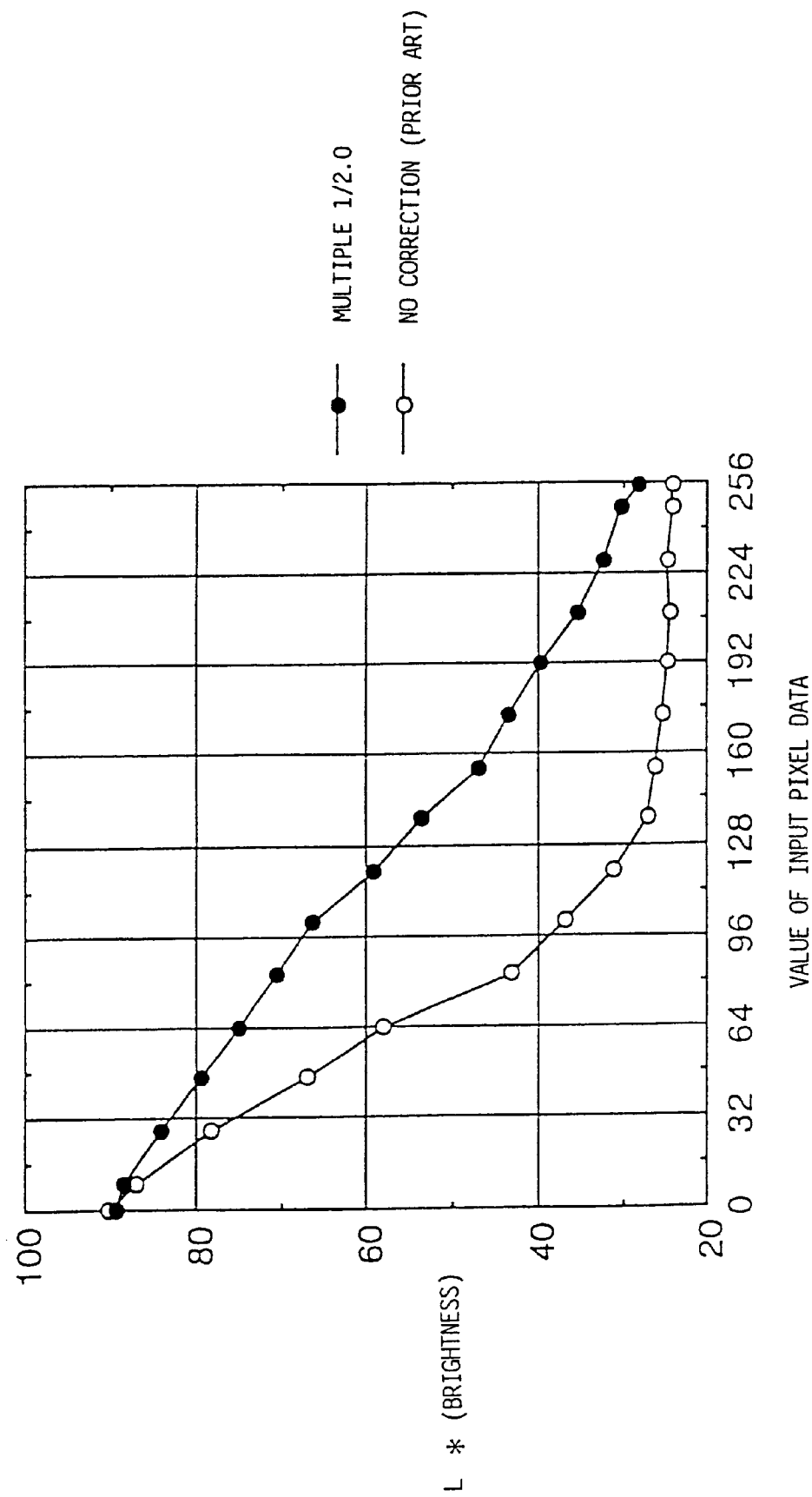
FIG. 7 is a diagram showing the gradation characteristic of a sample image which is printed when the printer system prints the image data which is processed by the error diffusion process based on the first embodiment of the image processing apparatus.

In addition, FIG. 7 is a diagram showing a gradation characteristic of a sample image which is printed when a printer system (laser printer) prints the image data which is processed by the error diffusion process based on this embodiment. In FIG. 7, the ordinate indicates the $L^*$ axis (lightness) out of the $L^*$, $a^*$ and $b^*$ axes of the CIELAB color space, and the abscissa indicates the value of the target pixel data, that is, the value (luminance and density) of the input pixel data. Furthermore, in FIG. 7, a black circular mark indicates the gradation characteristic for the case where the operation unit 41 is provided and the coefficient $1/A=½$, and a white circular mark indicates the gradation characteristic for the case where no operation unit 41 is provided.

In this embodiment, A=2, however, the value of A is of course not limited to 2. When A=2, the operation in the operation unit 41 can be carried out by simply shifting the binary data by 1 bit, thereby making it possible to carry out a high-speed data processing.

In order to realize a high-speed data processing, it is possible to reduce the computation time by constructing the operation unit 41 to carry out an addition after carrying out a division by 2 to a predetermined power. In other words, if the coefficient $1/A=120/256$, for example, 120 can be described by (128−8), and 120/256 is decomposed into (128/256−8/256). When the value of the input pixel data is shifted by 1 bit towards the right (towards the least significant bit (LSB)), a value B which is 128/256 times the input pixel data is obtained. When the value of the input pixel data is shifted by 5 bits towards the right (towards the LSB), a value C which is 8/256 times the input pixel data is obtained.

Hence, by calculating (B−C), it is possible to obtain the pixel data which is 120/256 times the input pixel data. When the shifting operation, addition and subtraction are carried out in this manner, the computation can be carried out in a short time as compared to the case where a multiplication and division are carried out, and a high-speed data processing becomes possible.

The coefficient 1/A used by the operation unit 41 is set in advance depending on the characteristic or the like of the engine 2 of the printer system 1, and it is possible to set the coefficient 1/A based on FIG. 6 or the like.

Figure 8:
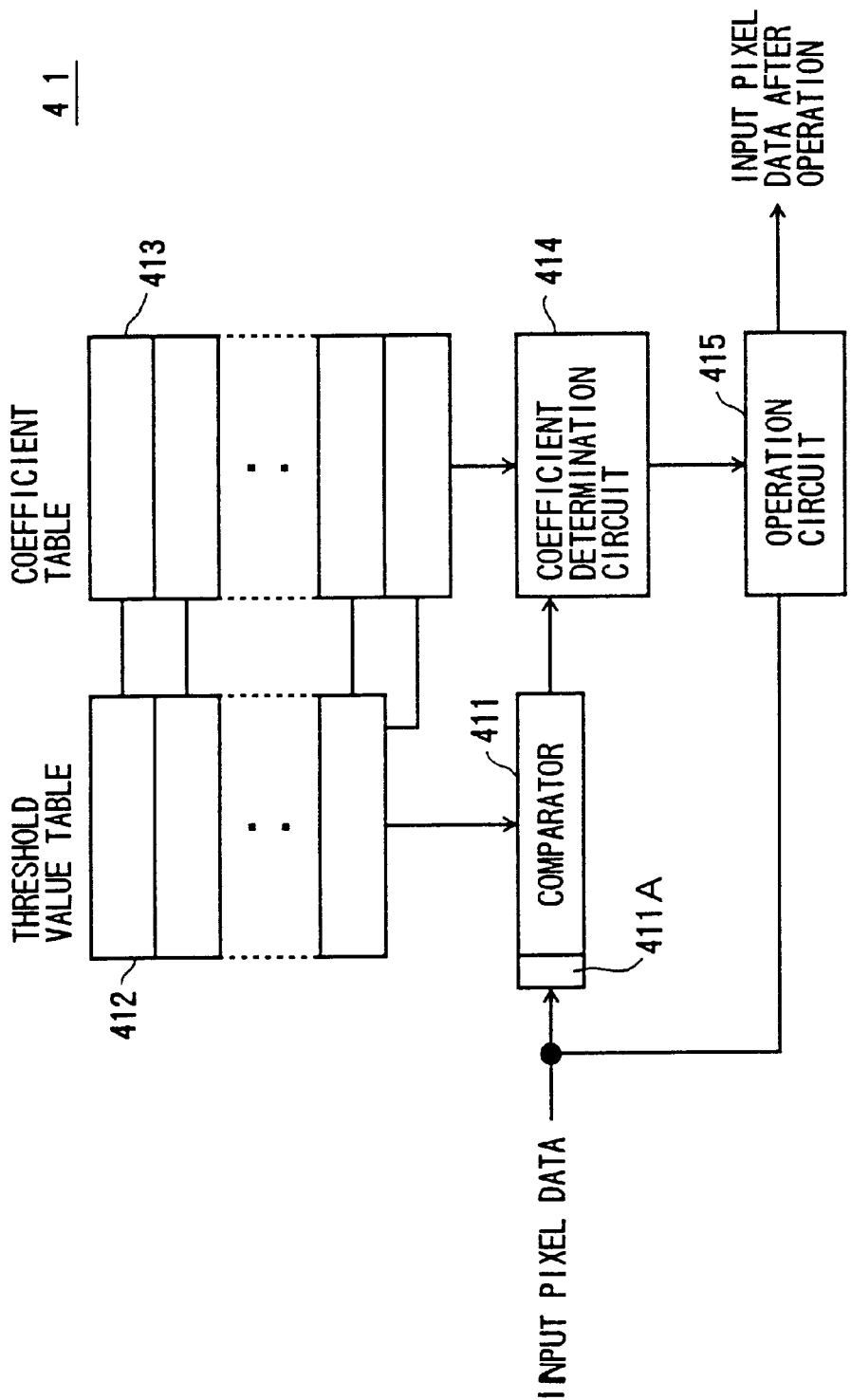
FIG. 8 is a system block diagram showing an embodiment of the construction of an operation unit of the first embodiment of the image processing apparatus.

FIG. 8 is a system block diagram showing an embodiment of the construction of the operation unit 41. The operation unit 41 includes a comparator 411, a threshold value table 412, a coefficient table 413, a coefficient determination circuit 414, and an operation circuit 415 which are connected as shown in FIG. 8. The target pixel data, that is, the input pixel data, is supplied to the comparator 411 and the operation circuit 415. The comparator 411 compares the value of the input pixel data and a plurality of threshold values stored in the threshold value table 412, and supplies a comparison result to the coefficient determination circuit 414. The coefficient table 413 stores a plurality of coefficients corresponding to the plurality of threshold values stored in the threshold value table 412, and a coefficient corresponding to the threshold value which is supplied from the threshold value table 412 to the comparator 411 is supplied from the coefficient table 413 to the coefficient determination circuit 414. The coefficient determination circuit 414 supplies the coefficient from the coefficient table 413 to the operation circuit 415 if the comparison result from the comparator 411 falls within a predetermined range. As a result, the operation circuit 415 outputs a result which is obtained by multiplying the coefficient determined by the coefficient determination circuit 414 to the input pixel data. In other words, according to the construction shown in FIG. 8, the coefficient which is multiplied to the input pixel data is automatically switched to an optimum value depending on the value of the input pixel data.

Instead of switching the coefficient depending on the value of the input pixel data, it is possible for example to switch the coefficient depending on the value of the pixel data related to the neighborhood pixel of the target pixel or depending on an average value of the values of the pixel data related to the neighborhood pixels of the target pixel.

Figure 9:
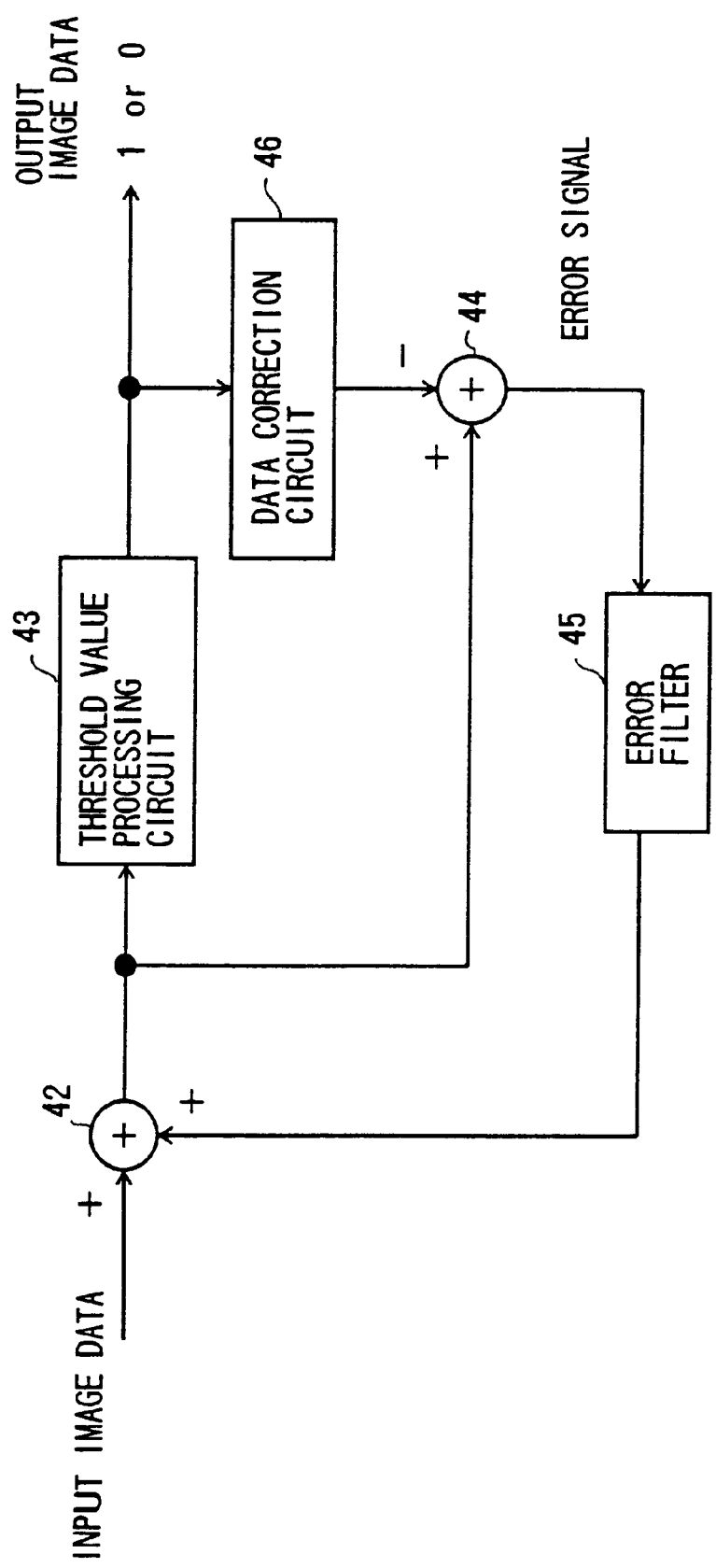
FIG. 9 is a system block diagram showing an important part of a second embodiment of the image processing apparatus according to the present invention.

Next, a description will be given of a second embodiment of the image processing apparatus according to the present invention. FIG. 9 is a system block diagram showing an important part of the second embodiment. In FIG. 9, those parts which have essentially the same functions as those corresponding parts in FIG. 3 are designated by the same reference numerals, and a description thereof will be omitted.

In FIG. 9, the error diffusion processing system of the image processing apparatus generally includes the adder 42, the threshold value processing circuit 43, the subtracting unit 44, the error filter 45, and a data correction circuit 46. This embodiment is characterized in that the data correction circuit 46 carries out a correction when calculating the error signal indicating the difference between the value of the input correction data and the value of the target pixel data in the step (v) described above. More particularly, the data correction circuit 46 multiplies a coefficient B to the value of the pixel data output from the threshold value processing circuit 43.

For the sake of convenience, it will be assumed that the input image data is a 8-bit bit map data having a value 0 for white and a value 255 for black, and that a binary output image data output from the threshold value processing circuit 43 has a value 0 for white and a value 1 for black. In this case, the process of the error diffusion processing system shown in FIG. 9 becomes as shown in FIGS. 10A and 10B when B=2. In FIGS. 10A and 10B, the left portion indicates the process for the case where no data correction circuit 46 shown in FIG. 9 is provided, and the right portion indicates the process for the case where the data correction circuit 46 shown in FIG. 9 is provided. Further, FIG. 10A indicates a case where the target pixel data, that is, the input pixel data has a value 140, and FIG. 10B indicates a case where the input pixel data has a value 80.

First, a description will be given of the process for the case where no data correction circuit 46 is provided. In this case, when the value of the input pixel data is 140 and an error value output from the error filter 45 is 20 as shown on the left portion of FIG. 10A, the input correction data output from the adder 42 has a value 160(=140+20). The error value is a sum of error values which are diffused with respect to the target pixel from the neighborhood pixels. If the threshold value is 128 and the value of the output pixel data of the threshold value processing circuit 43 is 1 (black), the value of the error signal output from the subtracting unit 44 is −95(=160−255). This error signal is distributed to the neighborhood pixels as the distributing error data dependent on the value of the diffusion matrix of the error filter 45.

Next, a description will be given of the process of this embodiment in which the data correction circuit 46 is provided. In this case, when the value of the input pixel data is 140 and an error value output from the error filter 45 is 20 as shown in the right portion of FIG. 10A, the value of the input correction data output from the adder 42 has a value 160(=140+2). It the threshold value is 128 and the value of the output pixel data of the threshold value processing circuit 43 is 1 (black), the data correction circuit 46 corrects the value 1 of the output pixel data indicating black to 255, and the coefficient B=2 is multiplied to the correction value 255. The data correction circuit 46 supplies the output correction value 510(=255×2) to the subtracting unit 44. Accordingly, the value of the error signal output from the subtracting unit 44 in this case is −350(=160−510). This error signal is distributed to the neighborhood pixels as the distributing error data dependent on the value of the diffusion matrix. For example, if the distribution with respect to the neighborhood pixels of the target pixel indicated by a mark "*" in FIG. 5 is set as shown in FIG. 5, the distribution with respect to the pixel located at the bottom right of the target pixel is −350×($\frac{1}{16}$)≈−21.9, and the distribution with respect to the pixel located at the bottom of the target pixel is −350×($\frac{5}{16}$)≈−109.4.

Therefore, although the value of the error signal is −95 when no data correction circuit 46 is provided, the value of the error signal becomes −350 when the data correction circuit 46 is provided, and this embodiment can diffuse a large negative error to the neighborhood pixels compared to the case where no data correction circuit 46 is provided. As a result, this embodiment can reduce the dots which become black pixels, and the excessive increase of the density due to the large diameter of the dots is suppressed, thereby making it possible to obtain the density of the image which is originally desired.

As shown in the left portion of FIG. 10B, the value of the input pixel data is 80 when no data correction circuit 46 is provided, and the value of the input correction data output from the adder 42 is 100(=80+20) when the error value output from the error filter 45 is 20. If the threshold value is 128 and the value of the output pixel data of the threshold value processing circuit 43 is 0 (white), the value of the error signal output from the subtracting unit 44 is 100(=100−0). This error signal is distributed to the neighborhood pixels as the distributing error data dependent on the value of the diffusion matrix of the error filter 45.

On the other hand, when the data correction circuit 46 is provided and the value of the input pixel data is 80 and the error value output from the error filter 45 is 20 as shown in the right portion of FIG. 10B, the value of the input correction data output from the adder 42 is 100(=80+20). If the threshold value is 128 and the value of the output pixel data of the threshold value processing circuit 43 is 0 (white), the data correction circuit 46 multiplies the coefficient B=2 to the value 0 of the output pixel data indicating white. Hence, the data correction circuit 46 supplies an output correction value 0(=0×2) to the subtracting unit 44. Therefore, the value of the error signal output from the subtracting unit 44 is also 100(=100−0) in this case. This error signal is distributed to the neighborhood pixels as the distributing error data dependent on the value of the diffusion matrix.

In this embodiment, there is no need to supply to the adder 42 the image data which is obtained by converting the density of the image in advance. For this reason, the data processing is simple, and a high-speed data processing is possible. Furthermore, the coefficient B used in the data correction circuit 46 may be set in advance depending on the characteristic of the like of the engine 2 of the printer system 1.

Figure 11:
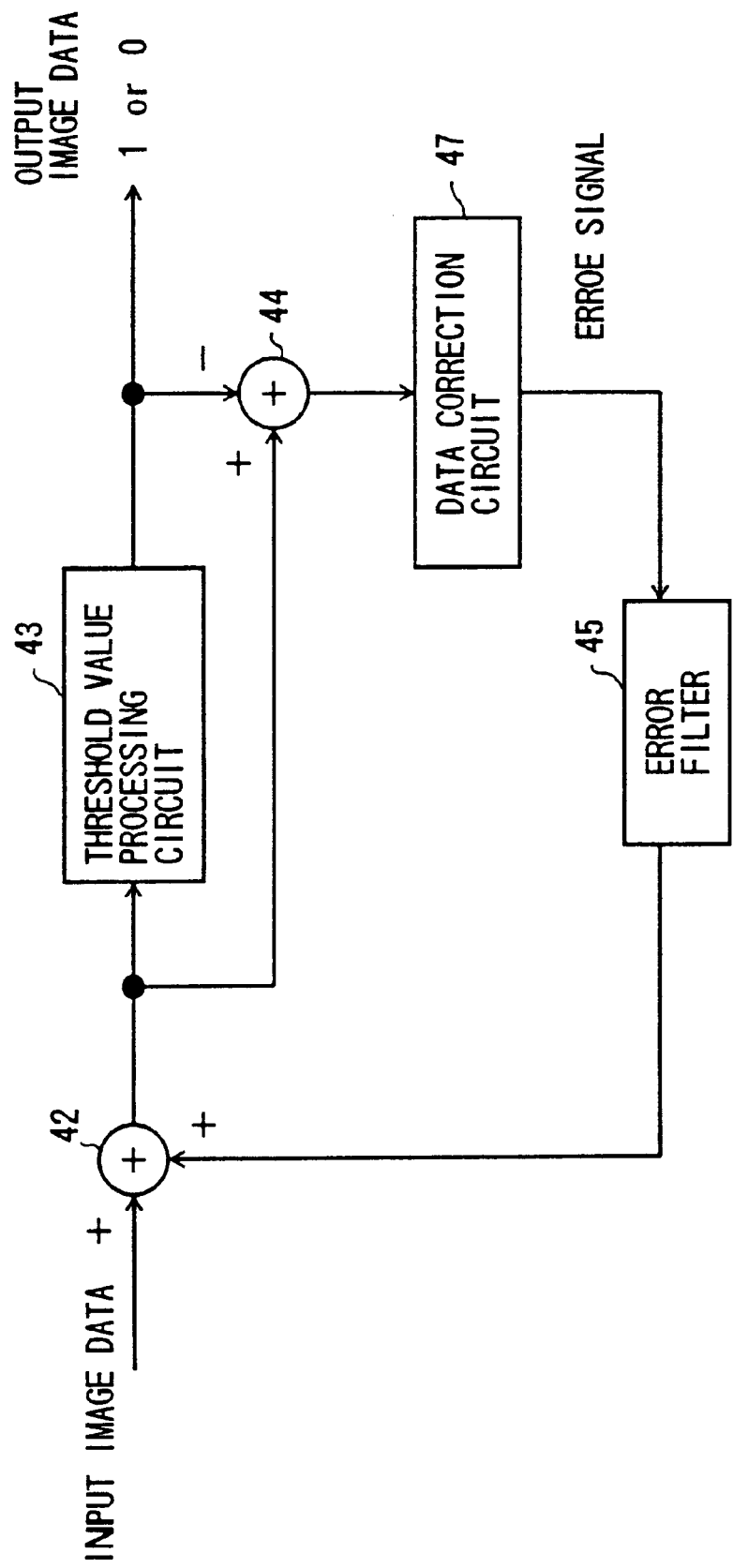
FIG. 11 is a system block diagram showing an important part of a third embodiment of the image processing apparatus according to the present invention.

Next, a description will be given of a third embodiment of the image processing apparatus according to the present invention. FIG. 11 is a system block diagram showing an important part of the third embodiment. In FIG. 11, those parts which have essentially the same functions as those corresponding parts in FIG. 9 are designated by the same reference numerals, and a description thereof will be omitted.

In FIG. 11, the error diffusion processing system of the image processing apparatus generally includes the adder 42, the threshold value processing circuit 43, the subtracting unit 44, the error filter 45, and a data correction circuit 47. This embodiment is characterized in that the data correction circuit 47 carries out a correction when calculating the error signal indicating the difference between the value of the input correction data and the value of the target pixel data in the step (v) described above. More particularly, the data correction circuit 47 switches the coefficient which is multiplied to the value of the error signal output from the subtracting unit 44 depending on whether the value of the pixel data output from the threshold value processing circuit 43 is 1 or 0. In other words, when the value of the pixel data output from the threshold value processing circuit 43 is 1 which indicates black, the value of the error signal output from the subtracting unit 44 is negative, and thus, the data correction circuit 47 multiplies a coefficient C which is greater than 1 to the value of the error signal and outputs the result of this multiplication. On the other hand, when the value of the pixel data output from the threshold value processing circuit 43 is 0 which indicates white, the value of the error signal output from the subtracting unit 44 is positive, and hence, the data correction circuit 47 outputs the value of the error signal as it is, that is, multiplies a coefficient 1 to the value of the error signal and outputs the result of this multiplication.

According to this embodiment, it is possible to obtain effects similar to those obtainable in the second embodiment described above.

Figure 12:
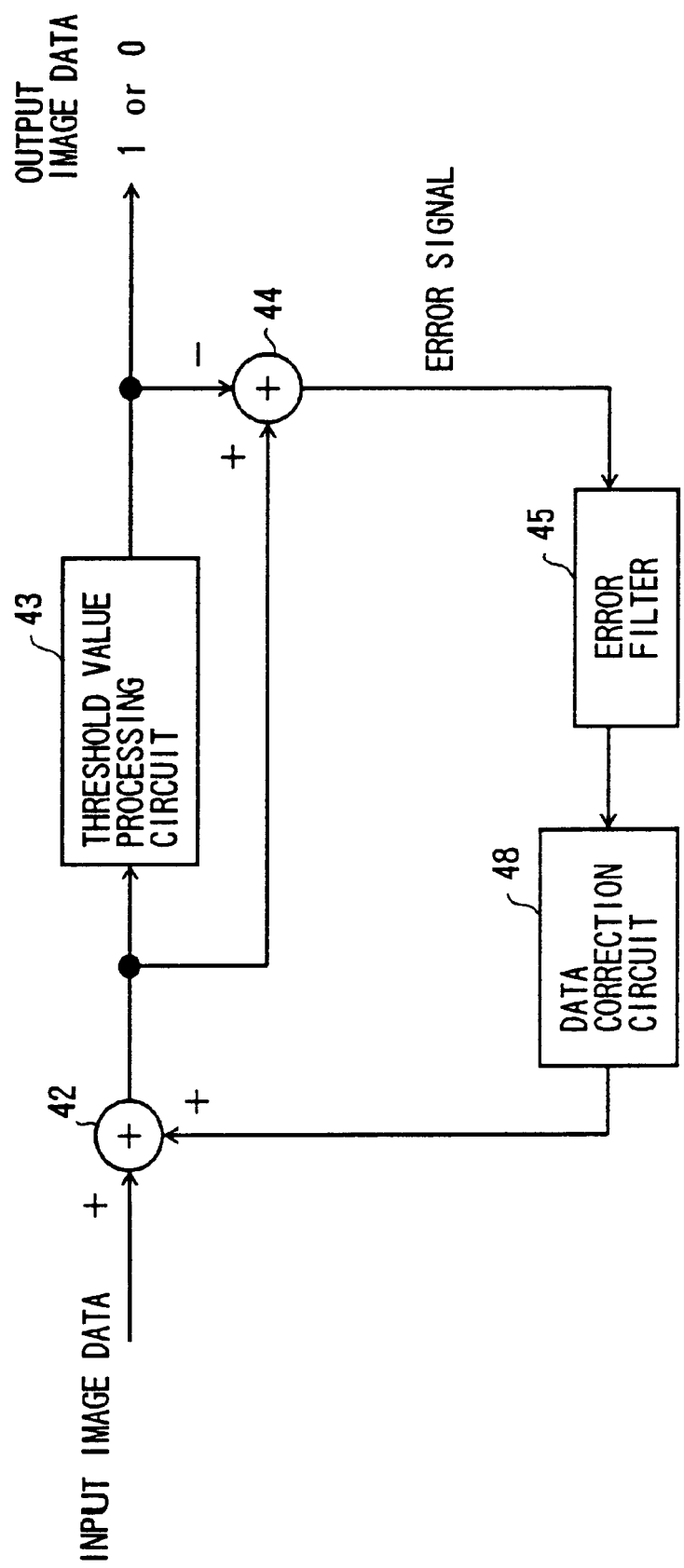
FIG. 12 is a system block diagram showing an important part of a fourth embodiment of the image processing apparatus according to the present invention.

Next, a description will be given of a fourth embodiment of the image processing apparatus according to the present invention. FIG. 12 is a system block diagram showing an important part of the fourth embodiment. In FIG. 12, those parts which have essentially the same functions as those corresponding parts in FIG. 9 are designated by the same reference numerals, and a description thereof will be omitted.

In FIG. 12, the error diffusion processing system of the image processing apparatus generally includes the adder 42, the threshold value processing circuit 43, the subtracting unit 44, the error filter 45, and a data correction circuit 48. This embodiment is characterized in that the data correction circuit 48 carries out a correction when distributing, with respect to the neighborhood pixels of the target pixel, the distributing error data which is obtained by multiplying the value of the diffusion matrix to the error signal when carrying out the step (vi) described above. More particularly, the data correction circuit 48 switches the coefficient which is multiplied to the error value output from the error filter 45 depending on whether the error value output from the error filter 45 is negative or positive. In other words, when the value of the pixel data output from the threshold value processing circuit 43 is 1 which indicates black, the value of the error signal output from the subtracting unit 44 and the error value output from the error filter 45 are both negative, and the data correction circuit 48 multiplies a coefficient C which is greater than 1 to the error value and outputs the result of this multiplication. On the other hand, when the value of the pixel data output from the threshold value processing circuit 43 is 0 which indicates white, the value of the error signal output from the subtracting unit 44 and the error value output from the error filter 45 are both positive, and the data correction circuit 48 outputs the error value as it is, that is, multiplies a coefficient 1 to the error value and outputs the result of this multiplication.

According to this embodiment, it is possible to obtain effects similar to those obtainable in the second embodiment described above. In addition, since this embodiment carries out the correction after distributing to the neighborhood pixels of the target pixel the distributing error data which is obtained by multiplying the value of the diffusion matrix to the error signal, there is an additional advantage in that the problem related to overflow is uneasily generated even if no special measures are taken with respect to the overflow.

Figure 13:
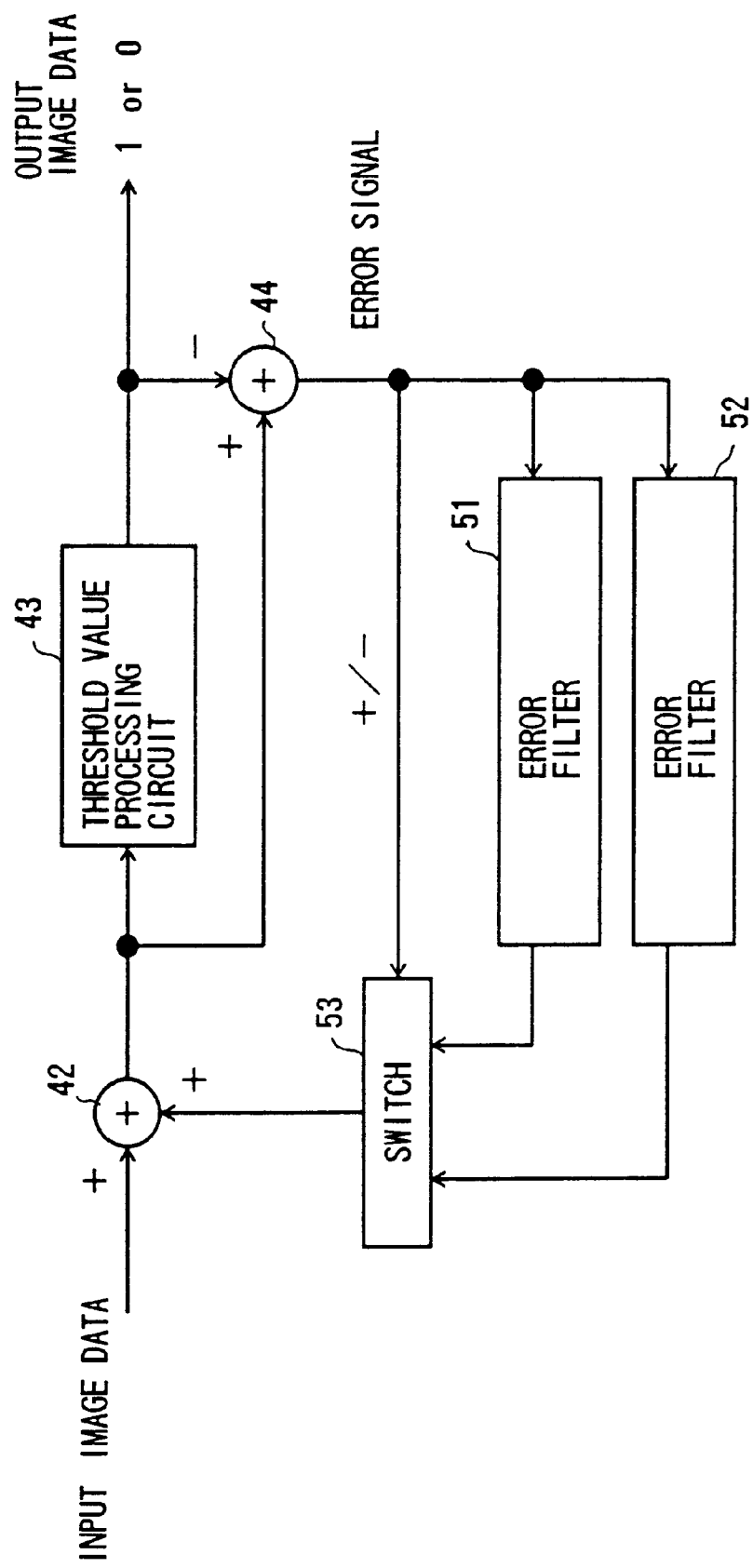
FIG. 13 is a system block diagram showing an important part of a fifth embodiment of the image processing apparatus according to the present invention.

Next, a description will be given of a fifth embodiment of the image processing apparatus according to the present invention. FIG. 13 is a system block diagram showing an important part of the fifth embodiment. In FIG. 13, those parts which have essentially the same functions as those corresponding parts in FIG. 9 are designated by the same reference numerals, and a description thereof will be omitted.

In FIG. 13, the error diffusion processing system of the image processing apparatus generally includes the adder 42, the threshold value processing circuit 43, the subtracting unit 44, error filters 51 and 52, and a switch 53. This embodiment is characterized in that a different diffusion matrix is used depending on whether the value of the pixel data output from the threshold value processing circuit 43 indicates black or white, when distributing the distributing error data which is obtained by multiplying the value of the diffusion matrix to the error signal with respect to the neighborhood pixels of the target pixel in the step (vi) described above. More particularly, the error signal output from the subtracting unit 44 is supplied to the error filters 51 and 52 and the switch 53. The error filter 51 distributes the distributing error data to the neighborhood pixels of the target pixel using a diffusion matrix that is suited for the case where the value of the pixel data output from the threshold value processing circuit 43 is 1 which indicates black, that is, the value of the error signal output from the subtracting unit 44 is negative. On the other hand, the error filter 52 distributes the distributing error data to the neighborhood pixels of the target pixel using a diffusion matrix that is suited for the case where the value of the pixel data output from the threshold value processing circuit 43 is 0 which indicates white, that is, the value of the error signal output from the subtracting unit 44 is positive. Output error values of the error filters 51 and 52 are supplied to the switch 53. The switch 53 is switched by the error signal so that the switch 53 supplies the output error value of the error filter 51 to the adder 42 when the value of the error signal output from the subtracting unit 44 is negative, and supplies the output error value of the error filter 52 to the adder 42 when the value of the error signal output from the subtracting unit 44 is positive.

According to this embodiment, it is possible to carry out a fine error diffusion process by changing the construction of the error filters 51 and 52, that is, by changing the diffusion matrix used and the like, depending on the shape of the dot, for example.

Figure 14:
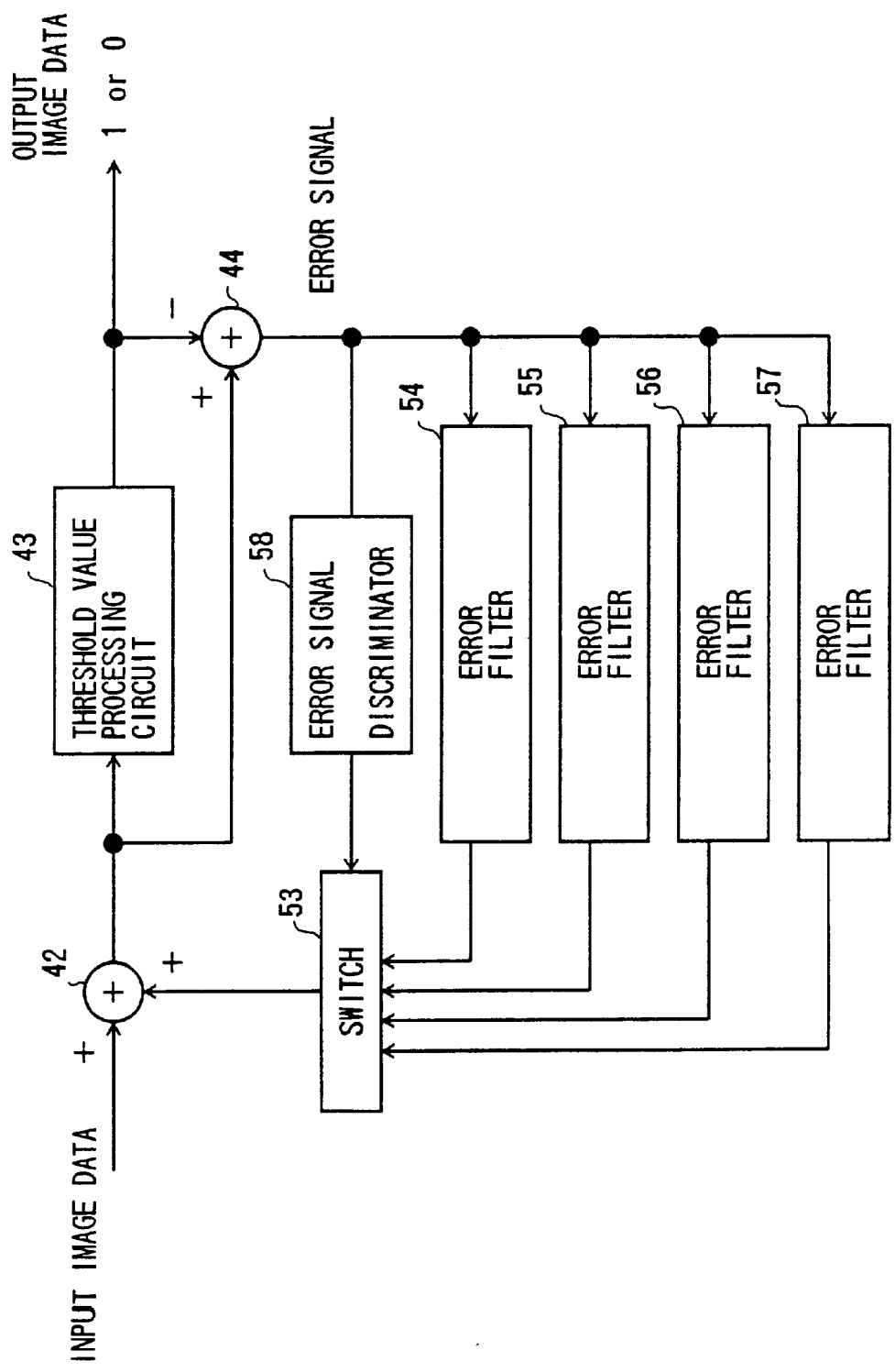
FIG. 14 is a system block diagram showing an important part of a sixth embodiment of the image processing apparatus according to the present invention.

Next, a description will be given of a sixth, embodiment of the image processing apparatus according to the present invention. FIG. 14 is a system block diagram showing an important part of the sixth embodiment. In FIG. 14, those parts which have essentially the same functions as those corresponding parts in FIG. 13 are designated by the same reference numerals, and a description thereof will be omitted. This embodiment further expands the fifth embodiment described above.

In FIG. 14, the error diffusion processing system of the image processing apparatus generally includes the adder 42, the threshold value processing circuit 43, the subtracting unit 44, error filters 54 through 57, an error signal discriminator 58, and a switch 59. This embodiment is characterized in that a different diffusion matrix is used depending on the level of the error signal output from the subtracting unit 44 when distributing the distributing error data which is obtained by multiplying the value of the diffusion matrix to the error signal with respect to the neighborhood pixels of the target pixel in the step (vi) described above. More particularly, the error signal output from the subtracting unit 44 is supplied to the error filters 54 through 57 and the error signal discriminator 58. The error filters 54 through 57 distribute the distributing error data to the neighborhood pixels of the target pixel using mutually different diffusion matrixes which are respectively suited for the four ranges of the value of the error signal output from the subtracting unit 44. Output error values of the error filters 54 through 57 are supplied to the switch 59. The switch 59 also receives from the error signal discriminator 58 a switching signal which is dependent on the level of the error signal. As a result, the switch 59 is switched based on the switching signal from the error signal discriminator 58 so as to selectively output the output error value of the error filter which uses the diffusion matrix suited for the range of the value of the error signal.

According to this embodiment, it is possible to carry out a finer error diffusion process as compared to the fifth embodiment described above. In addition, it is possible to reproduce a delicate tone curve because the error diffusion process can be changed depending on the level of the error signal.

Figure 15:
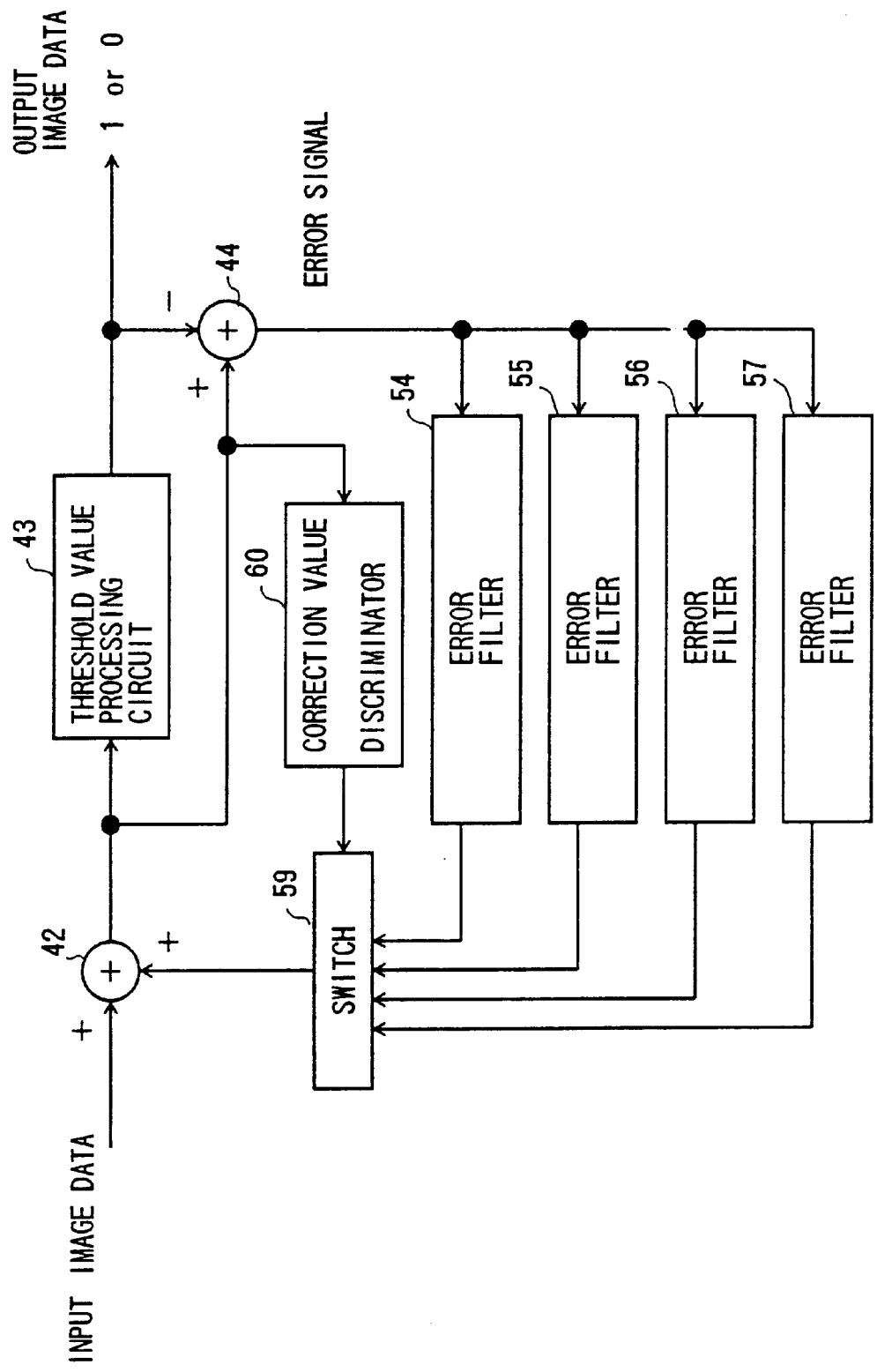
FIG. 15 is a system block diagram'showing an important part of a seventh embodiment of the image processing apparatus according to the present invention.

Next, a description will be given of a seventh embodiment of the image processing apparatus according to the present invention. FIG. 15 is a system block diagram showing an important part of the seventh embodiment. In FIG. 15, those parts which have essentially the same functions as those corresponding parts in FIG. 14 are designated by the same reference numerals, and a description thereof will be omitted. This embodiment further expands the fifth embodiment described above using a technique different from that used in the sixth embodiment.

In FIG. 15, the error diffusion processing system of the image processing apparatus generally includes the adder 42, the threshold value processing circuit 43, the subtracting unit 44, the error filters 54 through 57, the switch 59, and a correction value discriminator 60. This embodiment is characterized in that a different diffusion matrix is used depending on the level of the correction value output from the adder 42, when distributing the distributing error data which is obtained by multiplying the value of the diffusion matrix to the error signal with respect to the neighborhood pixels of the target pixel in the step (vi) described above. More particularly, the error signal output from the subtracting unit 44 is supplied to the error filters 54 through 57, and the correction value output from the adder 42 is supplied to the correction value discriminator 60. The error filters 54 through 57 distribute the distributing error data to the neighborhood pixels of the target pixel using mutually different diffusion matrixes which are respectively suited for the four ranges of the value of the error signal output from the subtracting unit 44. Output error values of the error filters 54 through 57 are supplied to the switch 59. The switch 59 also receives from the correction value discriminator 60 a switching signal which is dependent on the level of the correction value. As a result, the switch 59 is switched based on the switching signal from the correction value discriminator 60 so as to selectively output the output error value of the error filter which uses the diffusion matrix suited for the range of the value of the error signal.

According to this embodiment, it is possible to carry out a finer error diffusion process as compared to the fifth embodiment described above. In addition, it is possible to reproduce a delicate tone curve because the error diffusion process can be changed depending on the level of the correction value.

Figure 16:
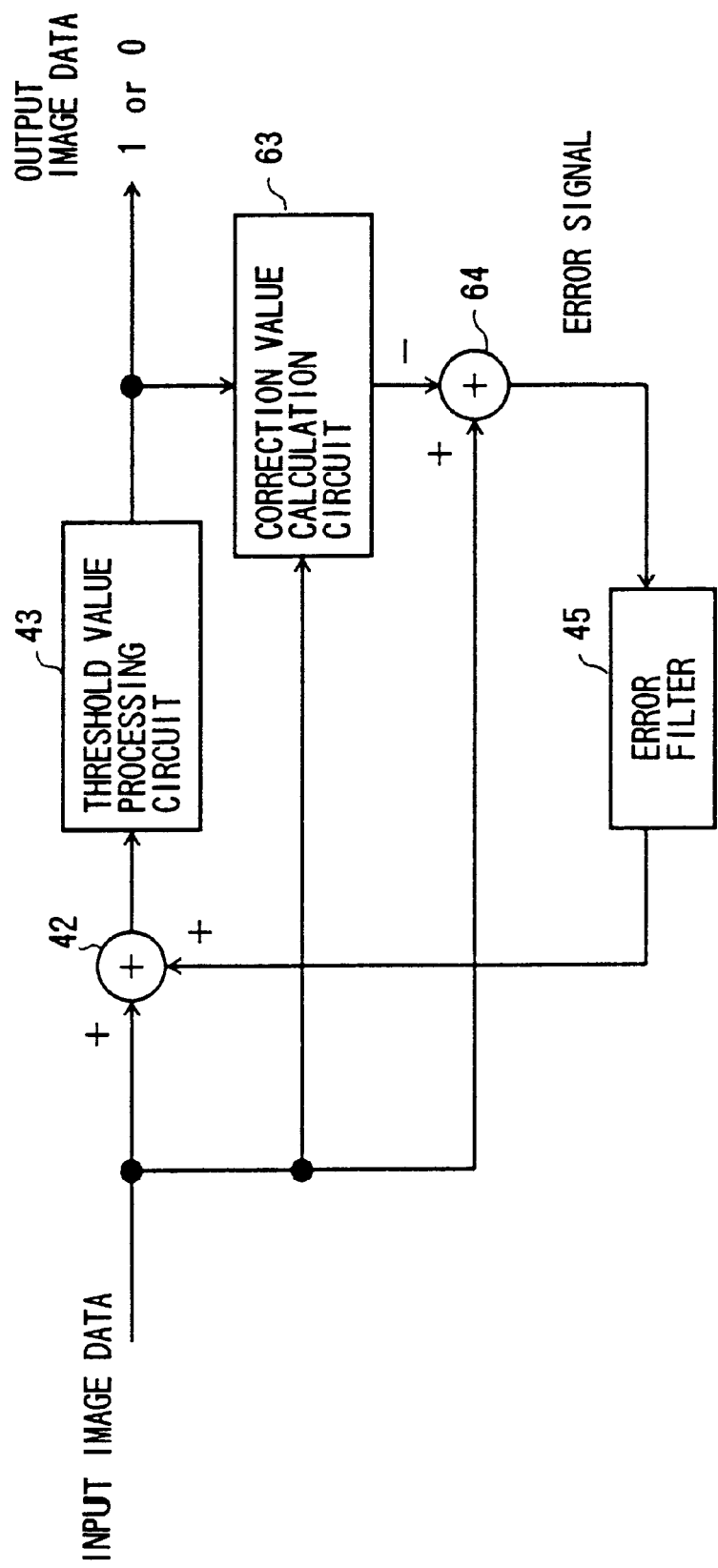
FIG. 16 is a system block diagram showing an important part of an eighth embodiment of the image processing apparatus according to the present invention.

Next, a description will be given of an eighth embodiment of the image processing apparatus according to the present invention. FIG. 16 is a system block diagram showing an important part of the eighth embodiment. In FIG. 16, those parts which have essentially the same functions as those corresponding parts in FIG. 3 are designated by the same reference numerals, and a description thereof will be omitted. This embodiment further expands the fifth embodiment described above using a technique different from that used in the seventh embodiment.

In FIG. 16, the error diffusion processing system of the image processing apparatus generally includes the adder 42, the threshold value processing circuit 43, the error filter 45, a correction value calculation circuit 63, and a subtracting unit 64. This embodiment is characterized in that processes of the correction value calculation circuit 63 and the subtracting unit 64 are carried out in place of the step (v) described above. More particularly, the correction value calculation circuit 63 corrects the output pixel data of the threshold value processing circuit 43 based on the input pixel data, and supplies the correction value data to the subtracting unit 64. The subtracting unit 64 subtracts the output correction value data of the correction value calculation circuit 63 from the input pixel data, so as to generate and supply the error signal to the error filter 45.

Figure 17A:
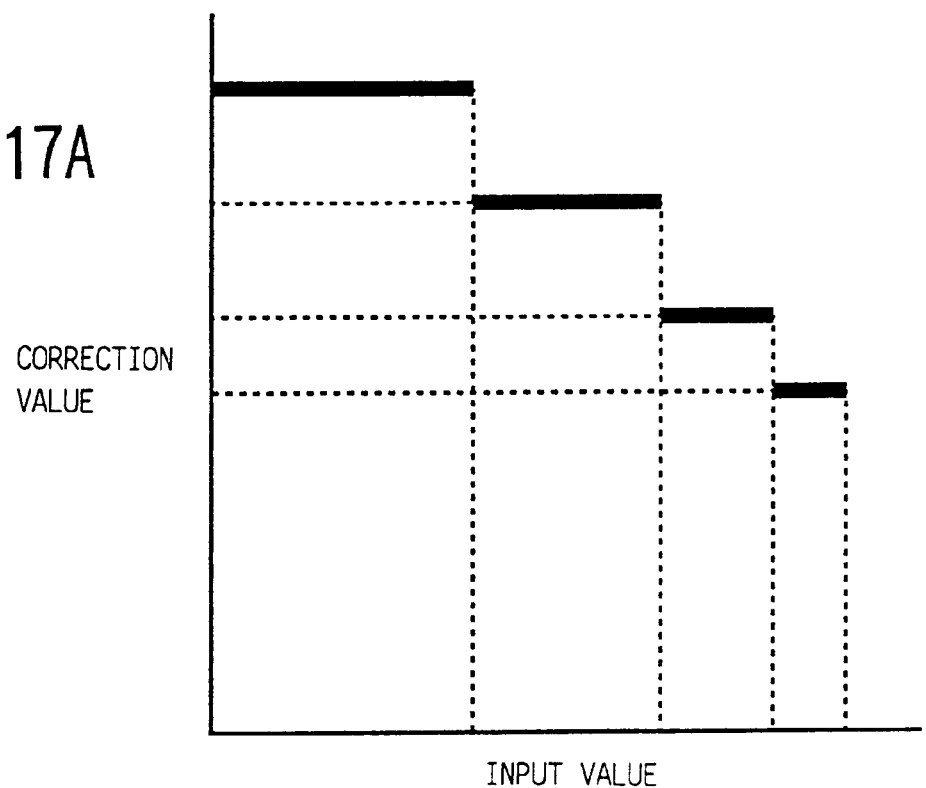
FIGS. 17A and 17B respectively are diagrams for explaining the operation of a correction value calculation circuit of the eighth embodiment of the image processing apparatus.
Figure 17B:
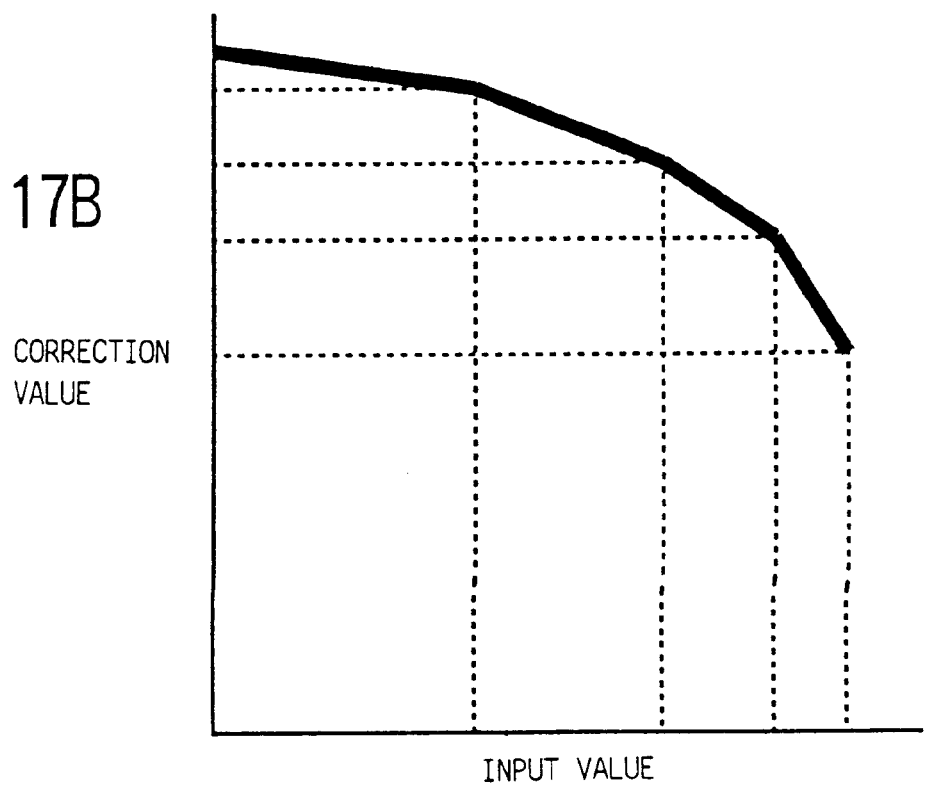

FIGS. 17A and 17B respectively are diagrams for explaining the operation of the correction value calculation circuit 63. In FIGS. 17A and 17B, the ordinate indicates the correction value output from the correction value calculation circuit 63 in arbitrary units, and the abscissa indicates the input value input to the correction value calculation circuit 63, that is, the output pixel data of the threshold value processing circuit 43 in arbitrary units. FIG. 17A shows a case where the input value and the correction value have a step-wise relationship, and FIG. 17B shows a case where the input value and the correction value have a folded line relationship.

According to this embodiment, it is possible to reproduce a delicate tone curve because it is possible to change the error diffusion process depending on the level of the input image data.

Figure 18:
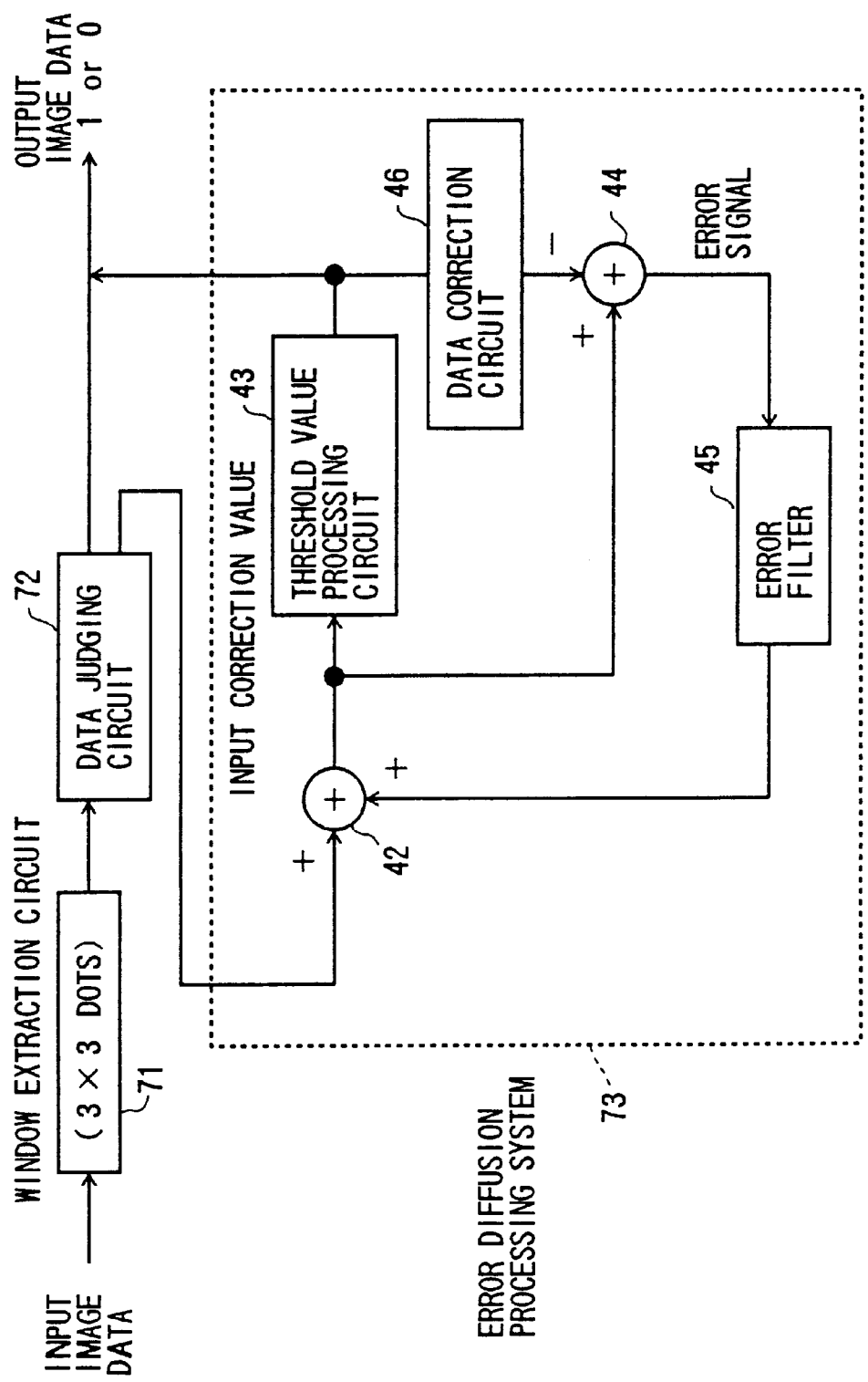
FIG. 18 is a system block diagram showing an important part of a ninth embodiment of the image processing apparatus according to the present invention.

Next, a description will be given of a ninth embodiment of the image processing apparatus according to the present invention. FIG. 18 is a system block diagram showing an important part of the ninth embodiment. In FIG. 18, those parts which have essentially the same functions as those corresponding parts in FIG. 9 are designated by the same reference numerals, and a description thereof will be omitted.

In FIG. 18, the image processing apparatus includes a window extraction circuit 71, a data judging circuit 72, and an error diffusion processing system 73 which is similar to that shown in FIG. 9. The window extraction circuit 71 The window extraction circuit 71 extracts a window having a predetermined range from the input image data, extracts pixel data related to the target pixel and its neighborhood pixels, and supplies the extracted pixel data to the data judging circuit 72. For example, if it is assumed for the sake of convenience that the window extraction circuit 71 extracts a window having a size of 3×3 dots, the pixel data of the target pixel located at the center of this window and the pixel data related to the 8 neighborhood pixels located around the periphery of the target pixel are extracted by the window extraction circuit 71 and supplied to the data judging circuit 72. The data judging circuit 72 judges whether the total of 9 pixel data, made up of the target pixel data and its surrounding pixel data, are to be converted into the binary data as they are and output or, are to be processed in the error diffusion processing system 73 provided at a latter stage, depending on whether the total of 9 pixel data all have the same value. In other words, in a case a where the pixel data within the window all indicate black or white, the inside of the window is printed solely in black or white. Hence, in this case, the error diffusion process of the error diffusion processing system 73 is not carried out, and the pixel. data are converted as they are into the binary data 1 or 0, and are output from the data judging circuit 72 as the output pixel data. On the other hand, in a case where not all of the pixel data within the window indicate black or white, that is, at least one of the pixel data within the window has a data value different from the other pixel data within the window, the pixel data are supplied from the data judging circuit 72 to the error diffusion processing system 73. In this latter case, the pixel data supplied to the error diffusion processing system 73 are subjected to an error diffusion process similar to that of the second embodiment described above, and the result of the processing is output from the error diffusion processing system 73 as the output pixel data.

According to this embodiment, it is possible to eliminate the problem of the density not being sufficiently high depending on the correction value, even at a part where the printing is to be made solely in black. In addition, in a part where the printing is to be made solely in black or white, no error diffusion process is carried out, thereby improving the data processing speed as a whole.

Figure 19:
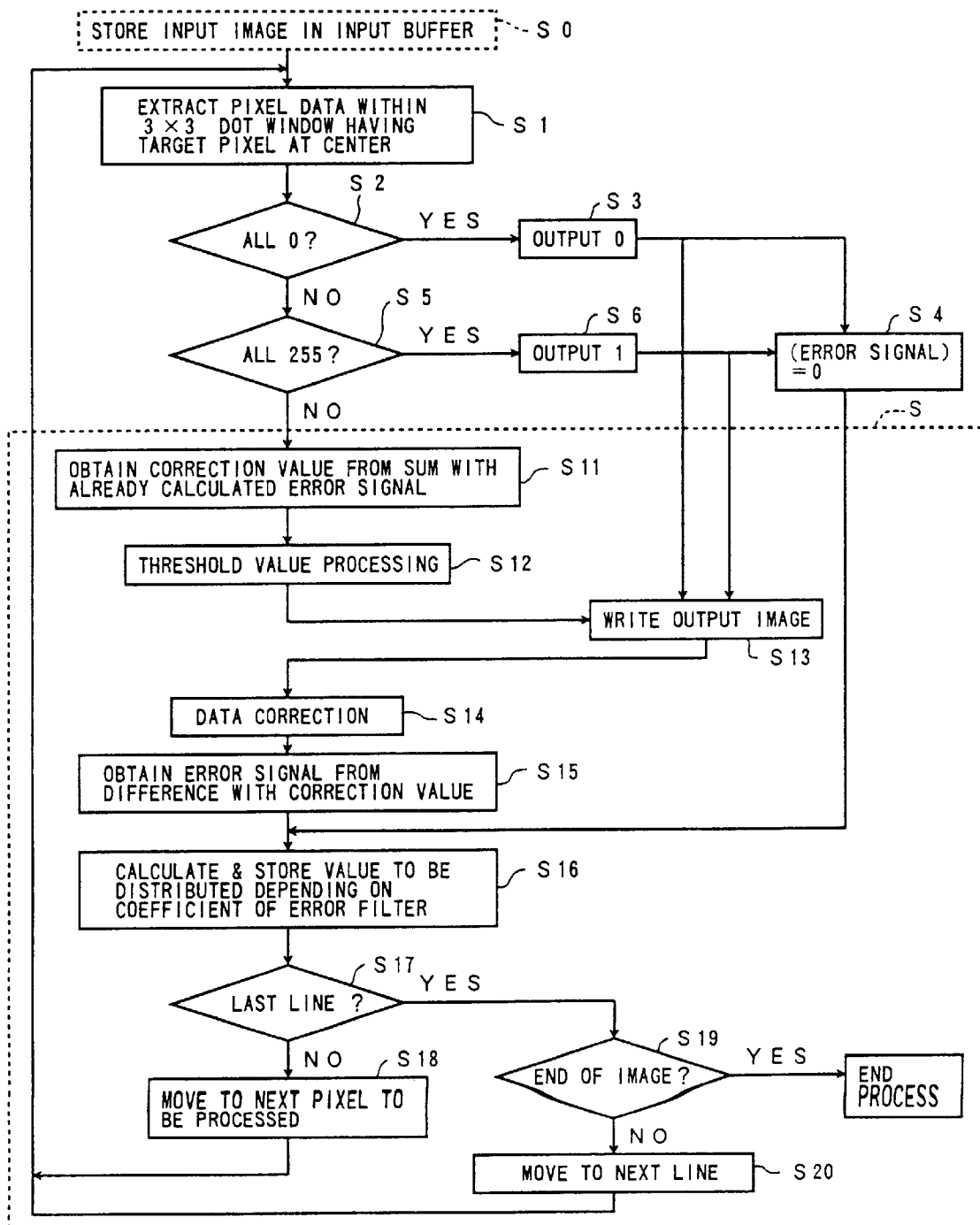
FIG. 19 is a flow chart for explaining the operation of the ninth embodiment of the image processing apparatus.

FIG. 19 is a flow chart for explaining the operation of the CPU 15 for a case where the process of the ninth embodiment described above is carried out by the CPU 15. In FIG. 19, the process of steps S11 through S20 surrounded by a phantom line S corresponds to the process of the error diffusion processing system 73 shown in FIG. 18.

When the input image data is supplied to the printer system 1, a step S0 shown in FIG. 19 stores the input image data in an input buffer (not shown). This input buffer may be the page buffer 19 within the printer controller 3-1 shown in FIG. 2, for example. In this state, the process of the image processing apparatus shown in FIG. 18 is started.

A step S1 extracts from the input image data that is read from the input buffer the pixel data within the window having the size of 3×3 dots having the target pixel located at the center of the window. A step S2 decides whether or not the pixel data within the window all have the value 0. If the decision result in the step S2 is YES, a step S3 converts the value of the output pixel data to 0, and the process advances to a step S4 which will be described later. On the other hand, if the decision result in the step S2 is NO, a step S5 decides whether or not the pixel data within the window all have the value 255. If the decision result in the step S5 is YES, a step S6 converts the value of the output pixel data to 1, and the process advances to the step S4. The step S4 sets the value of the error signal to 0, and the process advances to a step S16 which will be described alter. After the step S3 or S6, the process also advances in parallel to a step S13 which will be described later.

If the decision result in the step S5 is NO, a step S11 generates a correction signal (input correction value) by obtaining a sum of the input pixel data and the error signal which is already calculated. A step S12 carries out a threshold value processing corresponding to the process carried out by the threshold value processing circuit 43, and the process advances to the step S13. The step S13 writes the output image data into the page buffer 19, for example, so as to store the output image data. A step S14 carries out a correction process corresponding to the process carried out by the data correction circuit 46, and a step S15 obtains the error signal from a difference between the output pixel data and the correction signal.

The step S16 distributes, with respect to the neighborhood pixels of the target pixel, the distributing error data which is obtained by multiplying the value of the diffusion matrix to the error signal. In other words, the step S16 calculates and stores the values which are to be distributed to the neighborhood pixels depending on the coefficient of the error filter 45. A step S17 decides whether or not the line of the image indicated by the input image data is the last line. If the decision result in the step S17 is NO, a step S18 moves to the next pixel which is to be processed, and the process returns to the step S1. On the other hand, if the decision result in the step S17 is YES, a step S19 decides whether or not the last pixel of the image indicated by the input image data is reached. The process ends if the decision result in the step S19 is YES. If the decision result in the step S19 is NO, a step S20 moves to the next line which is to be processed, and the process returns to the step S1.

Figure 20:
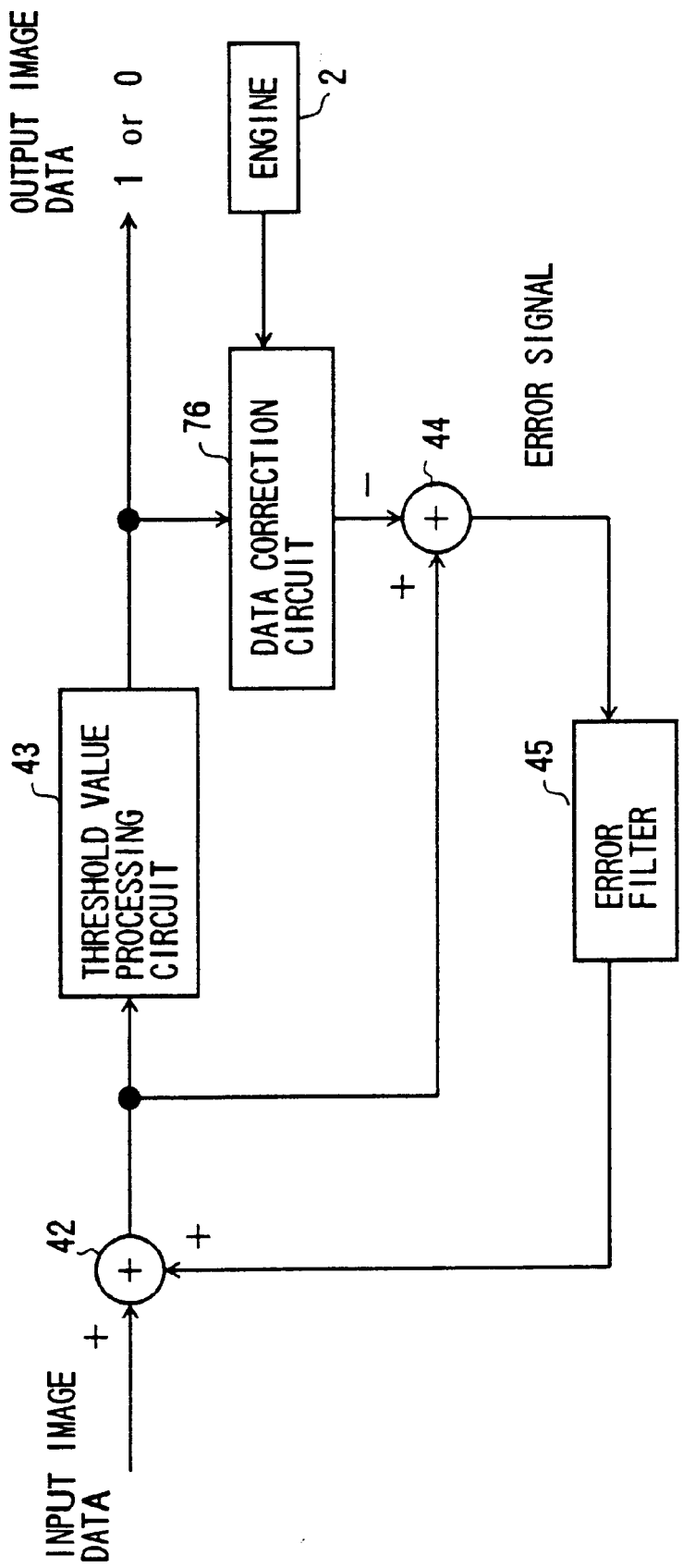
FIG. 20 is a system block diagram showing an important part of a tenth embodiment of the image processing apparatus according to the present invention.

Next, a description will be given of a tenth embodiment of the image processing apparatus according to the present invention. FIG. 20 is a system block diagram showing an important part of the tenth embodiment. In FIG. 20, those parts which have essentially the same functions as those corresponding parts in FIGS. 1 and 9 are designated by the same reference numerals, and a description thereof will be omitted.

This embodiment is characterized in that the data correction of the error diffusion process is carried out based on data related to environmental changes obtained from the engine 2. In other words, by measuring in advance the changes in the printing characteristic with respect to the environmental changes and creating correction data corresponding to the measured changes in the printing characteristic, it becomes possible to constantly carry out the printing with a stable density by controlling the data correction using the corresponding correction data even when the environment changes.

For example, the environmental changes include a temperature change, a humidity change, a change in characteristic of a recording paper caused by a change in the recording paper used for the printing, and the like. In this embodiment, it is assumed for the sake of convenience that the environmental change is the temperature change, however, the environmental change is of course not limited to the temperature change.

Figure 21:
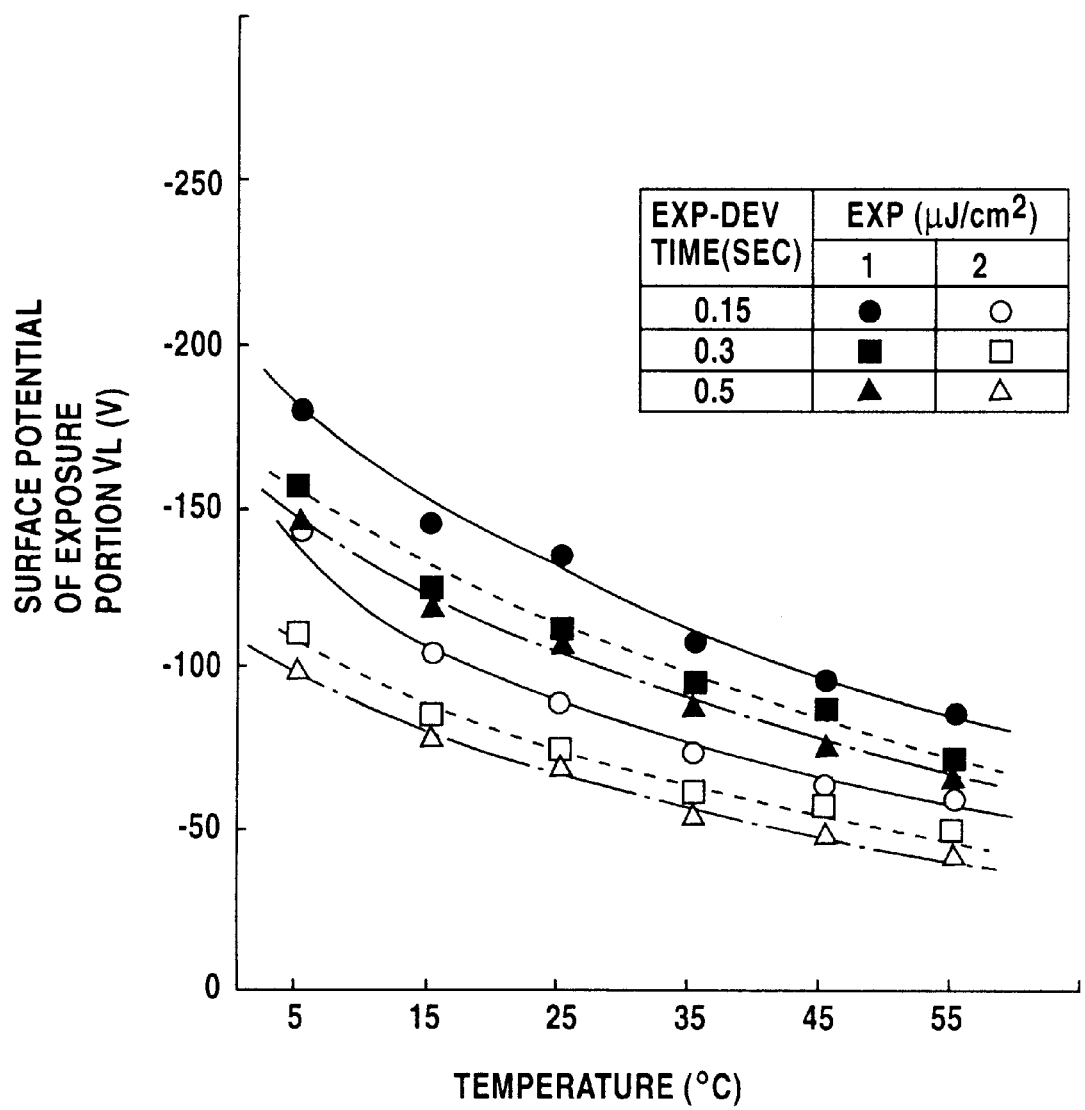
FIG. 21 is a diagram showing the light portion potential versus temperature characteristic.

FIG. 21 is a diagram showing the relationship of a surface potential (hereinafter referred to as a light portion potential)

Figure 22:
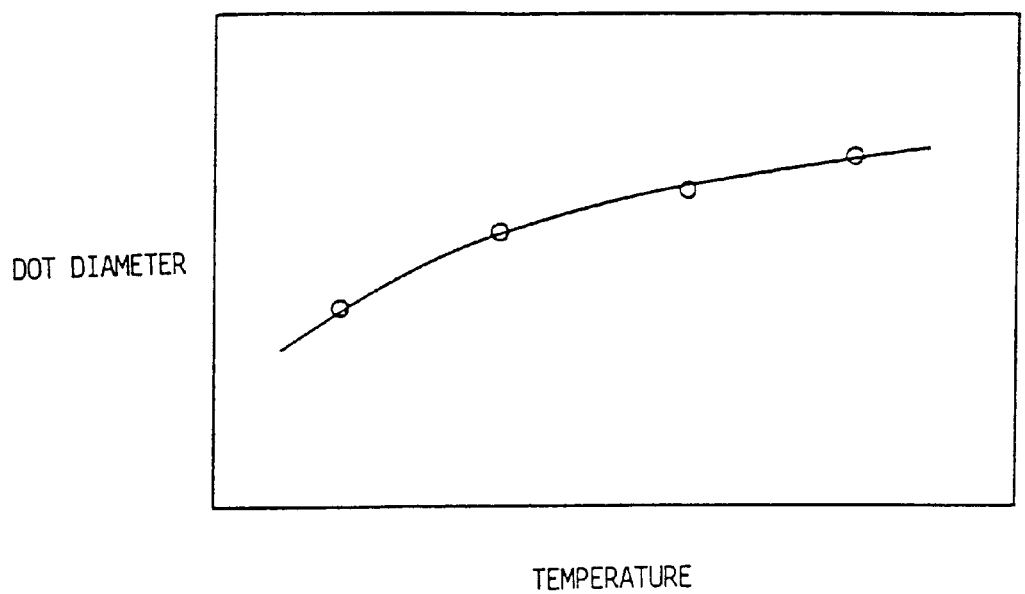
FIG. 22 is a diagram showing the dot diameter versus temperature characteristic.

VL of a portion of a photoconductive body of the laser optical system exposed by a laser light and the temperature. In addition, FIG. 22 is a diagram showing the relationship of a dot diameter and the temperature respectively in arbitrary units. Accordingly, it is possible to create in advance the data correction value with respect to the temperature based on FIGS. 21 and 22. FIG. 23 is a diagram showing a table which stores voltage data V1 through VM obtained from a temperature sensor and corresponding data correction values C1 through CM. Based on the voltage data obtained from the temperature sensor, the data correction circuit 76 carries out a data correction by reading the corresponding data correction value, that is, the optimum data correction value with respect to the detected temperature, using the table shown in FIG. 23. As a result, it is possible to correct the change in the printing characteristic (dot diameter) with respect to the environmental change (temperature change in this case), and a stable gradation characteristic can be reproduced.

Figure 24:
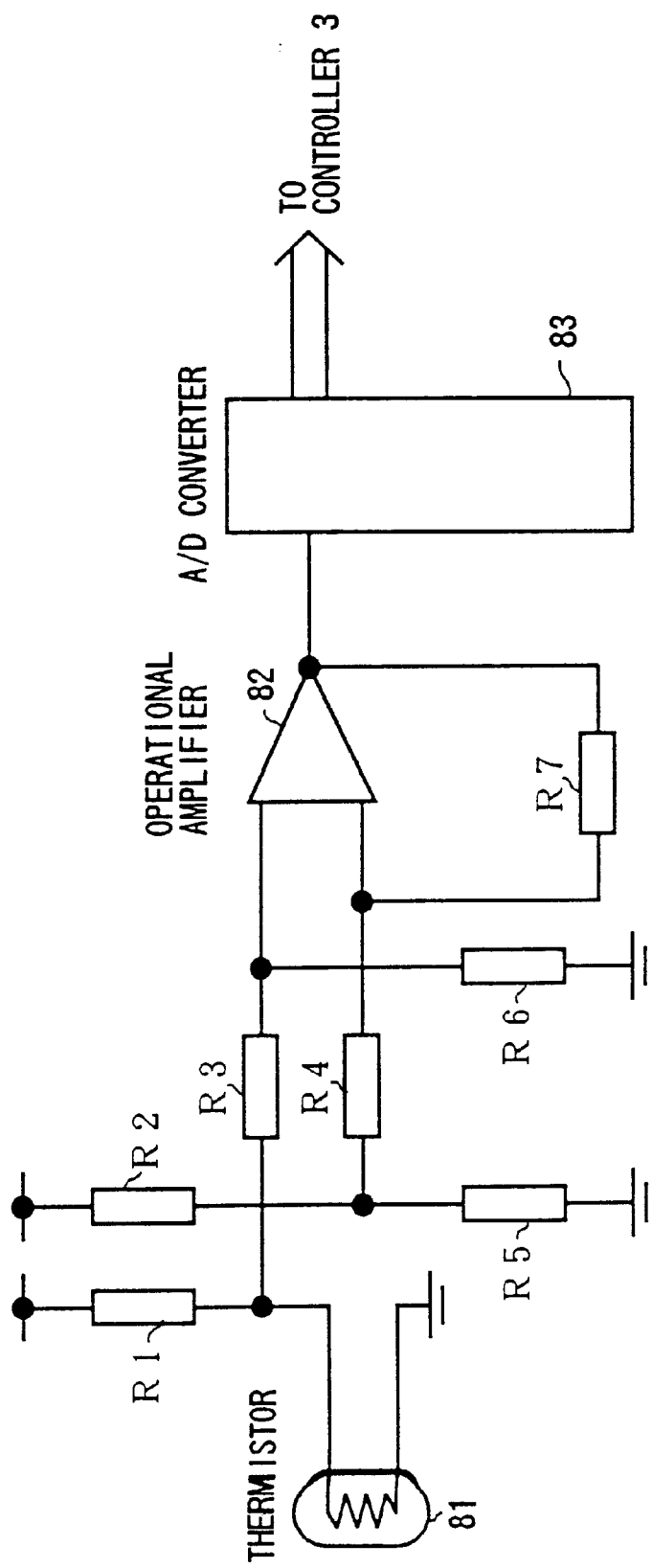
FIG. 24 is a diagram showing a temperature sensor of the tenth embodiment of the image processing apparatus.

FIG. 24 is a diagram showing an embodiment of the temperature sensor that may be used in this embodiment. The temperature sensor includes a thermistor 81, resistors R1 through R7, an operational amplifier 82, and an analog-to-digital (A/D) converter 83 which are connected as shown in FIG. 24. A temperature data detected by the thermistor 81 is supplied to the A/D converter 83 via the resistors and the operational amplifier 82, and is converted into a digital voltage data corresponding to the detected temperature. The digital voltage data output from the A/D converter 83 is supplied to the printer controller 3-1 of the controller 3 shown in FIG. 1, and more particularly to the CPU 15 shown in FIG. 2 via the network IF 11 and the bus 21.

This embodiment may be applied to a printer system which combines this embodiment and at least one of the first through ninth embodiments described above, by correcting the coefficient that is used for the multiplication, the coefficient of the error filter and the like by the data correction value which is dependent on the environmental change.

Next, a description will be given of an eleventh embodiment of the image processing apparatus according to the present invention, by referring to FIG. 25. An error diffusion processing system having a construction similar to that of the first embodiment shown in FIG. 3 may be used as an error diffusion processing system of this embodiment, and for this reason, illustration and description of the error diffusion processing system of this embodiment will be omitted. This embodiment is characterized in that the value of the coefficient multiplied by the operation unit 41 is switched depending on the value of the input pixel data.

Figure 25:
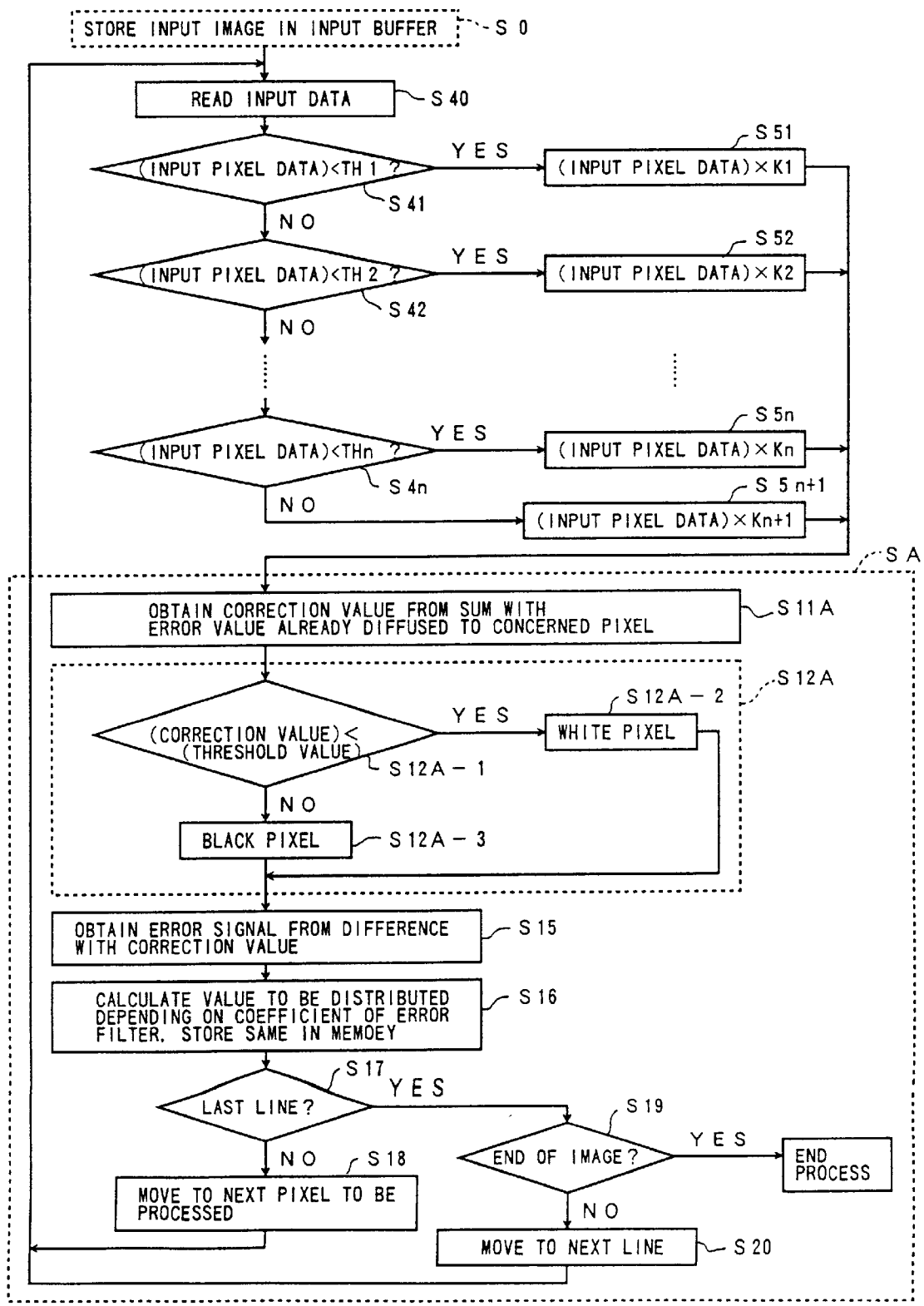
FIG. 25 is a flow chart for explaining the operation of an eleventh embodiment of the image processing apparatus according to the present invention.

FIG. 25 is a flow chart for explaining the operation of the CPU 15 for a case where the process of this embodiment is carried out by the CPU 15. In FIG. 25, those steps which are essentially the same as those corresponding steps in FIG. 19 are designated by the same reference numerals, and a description thereof will be omitted. In FIG. 25, the process of steps S11A through S20 surrounded by a phantom line SA corresponds to the process of the error diffusion processing system shown in FIG. 3, and steps S12A-1 through 12A-3 surrounded by a phantom line 12A correspond to the step S12 shown in FIG. 19.

When the input image data is supplied to the printer system 1, the step S0 shown in FIG. 25 stores the input image data in the input buffer (not shown). In this state, the process of the image processing apparatus shown in FIG. 18 is started.

A step S40 reads the input pixel data from the input buffer, and a step S41 decides whether or not the input pixel data is smaller than a threshold value TH1. If the decision result in the step S41 is NO, a step S42 decides whether or not the input pixel data is smaller than a threshold value TH2. If the decision result in the step S42 is NO, processes similar to the above are carried out thereafter, and finally, a step S4n decides whether or not the input pixel data is smaller than a threshold value THn. A step S51 multiplies a coefficient K1 to the input pixel data if the decision result in the step S41 is YES. A step S52 multiplies a coefficient K2 to the input pixel data if the decision result in the step S42 is YES. Processes similar to the above are carried out thereafter, and finally, a step S5n multiplies a coefficient Kn to the input pixel data if the decision result in the step S4n is YES. In addition, if the decision result in the step S4n is NO, a step S5n+1 multiplies a coefficient Kn+1 to the input pixel data.

After one of the steps S51 through S5n+1, the process advances to the step S11A. The step S11A generates a correction signal (input correction value) by obtaining a sum of the input pixel data and the error value which is already diffused, that is, a sum of the input pixel data and the error signal which is already calculated. The step S12A carries out a threshold value processing corresponding to the process which is carried out by the threshold value processing circuit 43, and the process advances to the step S15. In the step S12A, the step S12A-1 decides whether or not the input correction value is smaller than a threshold value. If the decision result in the step S12A-1 is YES, the step S12A-2 sets the output pixel data to a white pixel, and the process advances to the step S15. On the other hand, if the decision result in the step S12A-1 is NO, the step S12A-3 sets the output pixel data to a black pixel, and the process advances to the step S15. The step S15 obtains the error signal from the difference between the output pixel data and the correction signal. The process carried out after the step S15 is essentially the same as that shown in FIG. 19.

In this embodiment, the value of the coefficient used for the multiplication in the operation unit 41 is switched depending on the value of the input pixel data. For this reason, it is possible to finely control the density, and the saturation phenomenon of the density particularly at the high densities can be prevented. In a case where the number of threshold values TH1 through THn used in the steps S41 through S4n is relatively large, it is possible to reduce the data processing time as a whole by taking the following steps. That is, the input pixel data is first compared with a threshold value in a vicinity of the center of the range of the value the input pixel data may assume, and the process of comparing the input pixel data and a threshold value in a vicinity of the center of the range which is used for the previous comparison is repeated, so that the average number of comparisons is reduced.

Next, a description will be given of a twelfth embodiment of the image processing apparatus according to the present invention. In the first through eleventh embodiments described above, the error calculation accuracy is improved when the error diffusion process is carried out using 16-bit data, even if the input pixel data is 8 bits. However, from the point of view of the data processing speed, the larger the number of bits of data, the longer the data processing time. Hence, this embodiment is provided with a means for improving the data processing speed without greatly deteriorating the calculation accuracy.

In other words, in a case where the data correction by the data correction circuit 46 in the second embodiment described above is not carried out, for example, the value of the error signal is only approximately 255. However, in the case of the second embodiment described above, the value of the error signal increases to approximately 500 due to the data correction by the data correction circuit 46. For this reason, it is difficult to carry out the data processing in 8 bits. Thus, this embodiment shifts the value of the input pixel data by 2 bits, for example, towards the LSB, so as to carry out the process of converting the value to ¼ the original value. This conversion process can be made at a stage prior to the operation unit 41 or within the operation unit 41 in the case of the first embodiment described above, and a shift register or the like may be used to carry out the shifting process. When carrying out the conversion process within the operation unit 41, it is possible to provide a shift register 411A at an input stage of the comparator 411 in FIG. 8, for example. By carrying out such a conversion process, it becomes possible to carry out the calculation of the entire error diffusion processing system in 8 bits, and the decrease in the data processing speed is prevented. Although the calculation accuracy slightly deteriorates due to the conversion process described above, no problems are introduced from the practical point of view.

The above described conversion process may be carried out at locations dependent on the processes carried out by the second through eleventh embodiments described above.

Figure 26:
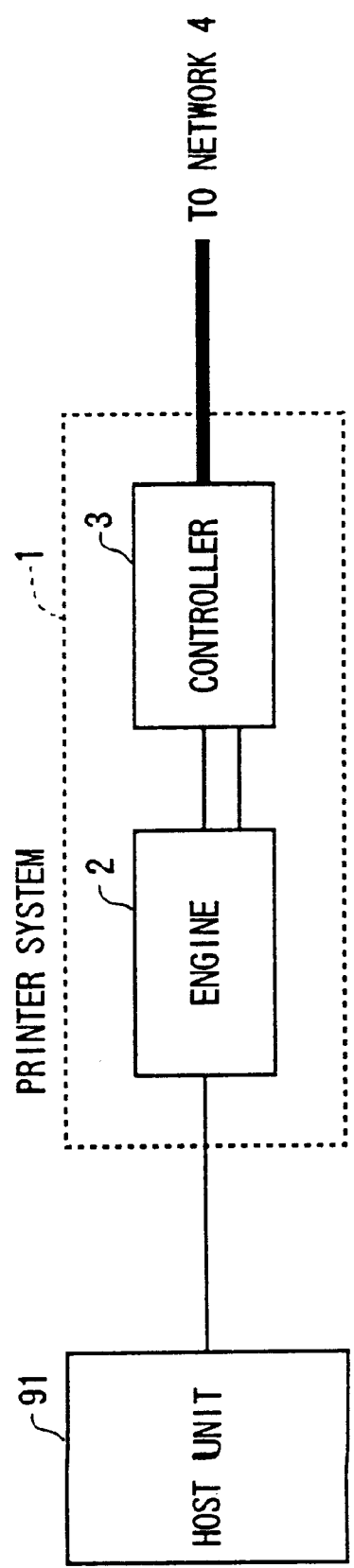
FIG. 26 is a system block diagram showing an important part of a thirteenth embodiment of the image processing apparatus according to the present invention.

Next, a description will be given of a thirteenth embodiment of the image processing apparatus according to the present invention. FIG. 26 is a system block diagram for explaining this embodiment. In FIG. 26, those parts which are the same as those corresponding parts in FIG. 1 are designated by the same reference numerals, and a description thereof will be omitted.

The engine 2 of the printer system 1 is coupled to a host unit (host computer) 91. A value which is set by a panel (not shown) of the engine 2 is supplied to the host unit 91. Hence, the host unit 91 can recognize various conditions and information set by the printer system 1. In this embodiment, parameters such as the coefficient used by the operation unit 41, the coefficients used by the data correction circuits 46 through 48 and 76, the coefficients used by the error filters 45, 51, 52 and 54 through 57, and the input value versus correction value characteristic used in the correction value calculation circuit 63 are set from the panel of the engine 2. By supplying these parameters to the host unit 91, the host unit 91 can also carry out the error diffusion process under the same conditions as the printer system 1, based on these parameters. Therefore, compatibility is maintained between the image data processed by the host unit 91 and the image data processed by the printer system 1, and the image data coherency is maintained within the entire system including the host unit 91.

Similarly, the parameters may be set from the host unit 91 and supplied to the printer system 1, so as to switch and set the parameters such as the coefficient used by the operation unit 41, the coefficients used by the data correction circuits 46 through 48 and 76, the coefficients used by the error filters 45, 51, 52 and 54 through 57, and the input value versus correction value characteristic used in the correction value calculation circuit 63.

Of course, the application of the present invention is not limited to printers. For example, the present invention is applicable to various kinds of image processing apparatuses including facsimile machines, for example.

Further, the present invention is not limited to these embodiments, but various variations and modifications may be made without departing from the scope of the present invention.

What is claimed is:

1. An image processing apparatus comprising:

a threshold value processing circuit subjecting a correction value with respect to an input image data to a threshold value process and outputting an output image data;

a subtracting circuit outputting an error signal based on a difference between the correction value and the output image data;

an error filter distributing, as a distributing error data dependent on a value of a diffusion matrix, the error signal to neighborhood pixels of a target pixel within the input image data; and a correction circuit multiplying a coefficient to the input image data or a coefficient to the output image data, wherein said input image data has a range of 0 to n, said correction circuit has an output having a range of 0 to m when said correction circuit multiplies the coefficient to the input image data, and said correction circuit has an output having a range of 0 to 1 when said correction circuit multiplies the coefficient to the output image data, and wherein m, n and 1 are real numbers, and m<n<1.

2. The image processing apparatus as claimed in claim 1, wherein said correction circuit multiplies the coefficient to the input image data, and the coefficient is different depending on a value of the input image data.

3. The image processing apparatus as claimed in claim 1, wherein said correction circuit multiplies the coefficient to the output image data, and the coefficient is different depending on a value of the output image data.

4. The image processing apparatus as claimed in claim 1, which further comprises:

a circuit setting the error signal to 0 and prohibiting the error diffusion process within a window which is made up of the target pixel and the neighborhood pixels when out of the input image data all pixel data within the window has a maximum density or a minimum density.

5. The image processing apparatus as claimed in claim 1, which further comprises:

a circuit controlling said correction circuit or said error filter depending on an environment.

6. The image processing apparatus as claimed in claim 1, which further comprises:

a circuit shifting bits of the input image data towards a least significant bit so as to reduce a number of bits which are processed.

7. The image processing apparatus as claimed in claim 1, which further comprises:

means for setting parameters of said correction circuit or said error filter.

8. An image processing apparatus comprising:

a threshold value processing circuit subjecting a correction value with respect to an input image data to a threshold value process and outputting an output image data;

a subtracting circuit outputting an error signal based on a difference between the correction value and the output image data;

an error filter, including a plurality of diffusion matrixes, distributing a distributing error data dependent on a value of a selected diffusion matrix of said plurality of diffusion matrixes, said selected matrix selected based on one of the input image data, the error signal and the correction value, the distributing error data being distributed to neighborhood pixels of a target pixel within the input image data; and a circuit setting the error signal to 0 and prohibiting the error diffusion process within a window which is made up of the target pixel and the neighborhood pixels when out of the input image data all pixel data within the window has a maximum density or a minimum density.

9. The image processing apparatus as claimed in claim 8, which further comprises:

a circuit controlling said correction circuit or said error filter depending on an environment.

10. The image processing apparatus as claimed in claim 8, which further comprises:

a circuit shifting bits of the input image data towards a least significant bit so as to reduce a number of bits which are processed.

11. The image processing apparatus as claimed in claim 8, which further comprises:

means for setting parameters of said correction circuit or said error filter.

12. An image processing apparatus comprising:

a threshold value processing circuit subjecting a correction value with respect to an input image data to a threshold value process and outputting an output image data;

a correction circuit correcting the output image data depending on the input image data;

a subtracting circuit outputting an error signal based on a difference between an output of said correction circuit and the input image data;

an error filter distributing, as a distributing error data dependent on a value of a diffusion matrix, the error signal to neighborhood pixels of a target pixel within the input image data; and a circuit setting the error signal to 0 and prohibiting the error diffusion process within a window which is made up of the target pixel and the neighborhood pixels when out of the input image data all pixel data within the window has a maximum density or a minimum density.

* * * * *